US009817861B2

(12) United States Patent
Grossman et al.

(10) Patent No.: US 9,817,861 B2
(45) Date of Patent: *Nov. 14, 2017

(54) SPIRITUAL RESEARCH SYSTEM AND METHOD

(71) Applicants: Andrew Grossman, Hopkins, MN (US); Clayton Darwin, Comer, GA (US); Richard Monson-Haefel, Minneapolis, MN (US); Kenneth F. Krutsch, Minnetonka, MN (US)

(72) Inventors: Andrew Grossman, Hopkins, MN (US); Clayton Darwin, Comer, GA (US); Richard Monson-Haefel, Minneapolis, MN (US); Kenneth F. Krutsch, Minnetonka, MN (US)

(73) Assignee: Ambient Consulting, LLC, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/181,821

(22) Filed: Jun. 14, 2016

(65) Prior Publication Data

US 2016/0299904 A1 Oct. 13, 2016

Related U.S. Application Data

(63) Continuation-in-part of application No. 13/833,340, filed on Mar. 15, 2013, now Pat. No. 9,430,518, (Continued)

(51) Int. Cl.
*G06F 17/00* (2006.01)
*G06F 17/30* (2006.01)
(Continued)

(52) U.S. Cl.
CPC ...... *G06F 17/30386* (2013.01); *G06F 3/0482* (2013.01); *G06F 17/218* (2013.01);
(Continued)

(58) Field of Classification Search
CPC ......... G06F 17/30011; G06F 17/30634; G06F 17/30386; G06F 17/2241; G06F 3/0482; G06F 17/218
(Continued)

(56) References Cited

U.S. PATENT DOCUMENTS 7,984,380 B2 7/2011 Mindrum
8,323,027 B2 12/2012 George
(Continued)

OTHER PUBLICATIONS

Nov. 30, 2015 U.S. Office Action (U.S. Appl. No. 13/832,249).
(Continued)

*Primary Examiner* — Phong Nguyen
(74) *Attorney, Agent, or Firm* — Tysver Beck Evans, PLLC

(57) ABSTRACT

A computerized system and method are presented that provide access to a research archive for researching fundamental texts of a variety of spiritual and religious domains. The research archive is oriented around ideas having snippets from the fundamental texts. Each idea is associated with a single life issue tag and a religious or spiritual domain. Each idea is further associated with a fixed number of commentaries that comment on the snippet from the point of view of the religious domain and its relationship to the associated life issue tag. The fixed number of commentaries are each written with respect to a particular role. Customized study guides to the spiritual documents can be created using the commentaries by selecting religious or spiritual domains or life issue tags to choose a subset of commentaries to be displayed with the spiritual document.

17 Claims, 13 Drawing Sheets

Related U.S. Application Data which is a continuation-in-part of application No. 13/832,249, filed on Mar. 15, 2013, now Pat. No. 9,626,386.

(51) Int. Cl.
*G06F 3/0482* (2013.01)
*G06F 17/21* (2006.01)
*G06F 17/22* (2006.01)

(52) U.S. Cl.
CPC .... *G06F 17/2241* (2013.01); *G06F 17/30011* (2013.01); *G06F 17/30634* (2013.01)

(58) Field of Classification Search
USPC .......................................... 707/661, 722, 758
See application file for complete search history.

(56) References Cited

U.S. PATENT DOCUMENTS

| | | | |
|---|---|---|---|
| 2002/0004792 A1* | 1/2002 | Busa | G06F 17/2715 706/50 |
| 2002/0103876 A1* | 8/2002 | Chatani | G06F 17/30864 709/217 |
| 2002/0168664 A1* | 11/2002 | Murray | G06F 19/28 435/6.14 |
| 2004/0083092 A1* | 4/2004 | Valles | G06F 17/2785 704/9 |
| 2005/0144042 A1* | 6/2005 | Joffe | G06Q 50/22 705/2 |
| 2005/0287505 A1 | 12/2005 | George | |
| 2006/0004601 A1* | 1/2006 | Marks | G06Q 10/06311 705/1.1 |
| 2006/0242309 A1* | 10/2006 | Damick | G06F 17/30699 709/229 |
| 2007/0088695 A1* | 4/2007 | Bleyendaal | G06F 17/30696 707/E17.082 |
| 2008/0208606 A1* | 8/2008 | Allsop | G06F 17/30867 705/1.1 |
| 2009/0019310 A1* | 1/2009 | Nastacio | G06F 11/0709 714/26 |
| 2009/0100369 A1 | 4/2009 | Mindrum | |
| 2009/0230668 A1 | 9/2009 | Andres | |
| 2009/0240671 A1* | 9/2009 | Torres | G06F 17/30011 707/999.004 |
| 2009/0248399 A1* | 10/2009 | Au | G06F 17/27 704/9 |
| 2009/0299988 A1* | 12/2009 | Hamilton, II | G06F 17/3066 707/E17.017 |
| 2009/0319338 A1 | 12/2009 | Parks et al. | |
| 2010/0101004 A1 | 4/2010 | Ragsdale, III | |
| 2010/0114937 A1 | 5/2010 | Hawthorne et al. | |
| 2010/0198627 A1* | 8/2010 | Moed | G06Q 10/02 705/5 |
| 2011/0055713 A1 | 3/2011 | Gruenewald et al. | |
| 2011/0065079 A1 | 3/2011 | Boswell | |
| 2011/0258552 A1 | 10/2011 | White | |
| 2012/0095993 A1* | 4/2012 | Shau | G06F 17/30675 707/723 |
| 2013/0171610 A1* | 7/2013 | Andres | G09B 5/00 434/365 |
| 2013/0238729 A1* | 9/2013 | Holzman | H04L 51/066 709/206 |
| 2013/0332952 A1 | 12/2013 | Anandpura et al. | |

OTHER PUBLICATIONS

Dec. 22, 2015 U.S. Office Action (U.S. Appl. No. 13/833,340).
Feb. 29, 2016 U.S. Office Action (U.S. Appl. No. 13/834,065).
Apr. 8, 2015 U.S. Office Action (U.S. Appl. No. 13/833,340).
Jun. 7, 2016 U.S. Office Action (U.S. Appl. No. 13/832,249).
Jul. 14, 2015 U.S. Office Action (U.S. Appl. No. 13/834,065).
Afterlife, Spiritual Science Research Foundation, Bridging the Known and Unknown Worlds, 2012.
Causes of Problems in Life, Spiritual Science Research Foundation, Life, Death and Afterlife, 2012.
Open Bible, Crossway Bible, Good News Publishers, retrieving from Internet, 2001.

\* cited by examiner

SPIRITUAL RESEARCH SYSTEM AND METHOD

CROSS REFERENCE TO RELATED APPLICATION

This application is a continuation-in-part of U.S. Ser. No. 13/833,340, filed Mar. 15, 2013, which in turn is a continuation-in-part of U.S. Ser. No. 13/832,249, filed Mar. 15, 2013, both of which are hereby incorporated by reference in their entireties.

FIELD OF THE INVENTION

The present application relates to the field of computerized systems that automate the process of spiritual research.

SUMMARY

An embodiment of the present invention provides one or more server computer systems that provide access to a research archive for researching fundamental texts of a variety of spiritual and religious domains.

DETAILED DESCRIPTION

System Overview

Figure 1:
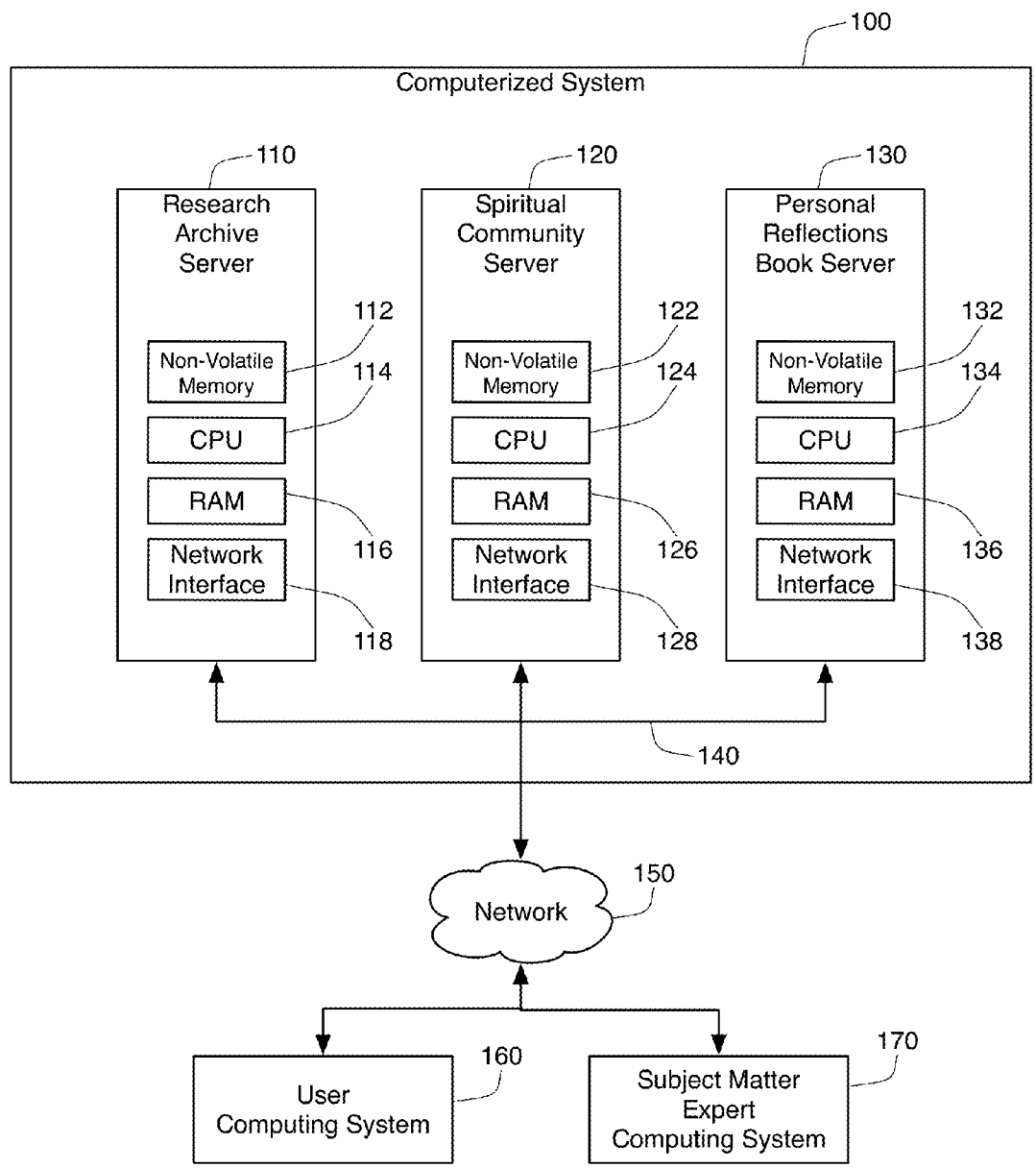
FIG. 1 is a schematic diagram showing a server capable of implementing a research archive of the present invention in the context of a larger system.

FIG. 1 shows the major elements of a system 100 in which the present invention can be used. In the embodiment shown in FIG. 1, the computerized system 100 utilizes three separate server systems, namely an archive server 110, a spiritual community server 120, and a personal reflections book server 130. Each of these servers 110, 120, 130 uses a set of software instructions or interfaces stored on a non-volatile, non-transitory, computer readable medium 112, 122, 132, respectively, such as a hard drive or flash memory device. A programmable digital processor 114, 124, 134, such as a general purpose CPU manufactured by Intel Corporation (Mountain View, Calif.) or Advanced Micro Devices, Inc. (Sunnyvale, Calif.), accesses and performs the software. To improve efficiency, the processors 114, 124, 134 may load software stored in memory 112, 122, 132 into faster, but volatile RAM 116, 126, 136. Data operated upon by the software can also be stored in non-volatile memory 112, 122, 132 and retrieved into RAM 116, 126, 136 for analysis, recording, and reporting. The software typically includes operating system software, such as LINUX (available from multiple companies under open source licensing terms) or WINDOWS (available from Microsoft Corporation of Redmond, Wash.).

Each of the server systems 110, 120, 130 further includes a network interface 118, 128, 138 to communicate with other computerized devices across a digital data network 150. In one embodiment, the network 150 is wide area network such as the Internet or a TCP/IP-based Intranet, and the network interfaces 118, 128, 138 each include TCP/IP protocol stacks for communicating over the network 150. The network interfaces 118, 128, 138 may connect to the network 150 wirelessly or through a physical wired connection. The network interfaces 118, 128, 138 can also be used to provide communication between the servers 110, 120, 130, such as over a local area network 140.

The computerized system 100 is shown in FIG. 1 as three separate server systems 110, 120, 130 to emphasize the distinct services provided by each of these systems 110, 120, 130. Each of these separate server systems 110, 120, 130 can be implemented on a single computer with a single processor 114, 124, 134. Alternatively, each server system 110, 120, 130 could also implemented using a network of computers all operating according to the instructions of the software. In fact, the entire system 100 could easily be implemented on a single computer system using one or more processors.

The computerized system 100 provides access to data on the servers 110, 120, 130 over the network 150 to a user computer system 160. The user computer system 160 could be similar in construction to the server systems 110, 120, 130 that make up system 100, utilizing a general-purpose processor such as those provided by Intel Corporation or Advanced Micro Devices. Alternatively, the user computer system 160 could be a portable computing device such as a tablet computer or smart phone. These kinds of devices generally use specific operating systems designed for mobile devices, such as iOS from Apple Inc. (Cupertino, Calif.) or ANDROID OS from Google Inc. (Menlo Park, Calif.), and also frequently use mobile specific processors, such as those designed by ARM Holdings (Cambridge, UK). The user computer system 160 allows a user to access and update the data found on the servers 110, 120, 130.

In addition, the computerized system 100 provides access to the data on the servers 110, 120, 130 to a subject matter expert (or "SME") computing system 170. Like the user computer system 160, the SME computing system 170 could be a general-purpose computer or a mobile device. Also like the user computer system 160, the SME computing system 170 accesses and updates the data found on the servers 110, 120, 130. The SME computing system 170 differs from the user computing system 160 in the type of access provided to the data and also in the type of tools that are made available to experts as they assist with the development of the data. The SME computing system 170 is usable only by experts in the religious and spiritual subject matters that are found in the servers 110, 120, 130. The system 100 grants these experts the ability to add and change data in the system 100 that is not alterable by other users.

Each server system 110, 120, 130 manages a database and provides interfaces to the database to one or more user computing systems 160 over the network 150. The archive server 110 contains data about spiritual texts and life issues. This data is sometimes referred to herein as the "research archive." The spiritual texts are taken from a variety of spiritual and religious beliefs referred to herein as domains. One of the primary data elements maintained by the archive server 110 is an "idea." Each idea contains or refers to a snippet or quotation from a spiritual text that is considered a foundational text for one of the domains of the research archive. Each idea also contains or refers to a set number of commentaries on the snippet. The commentaries are written from the point of view of a particular domain, and each commentary is written in the context of a particular approach to that domain. Furthermore, each idea approaches the snippet of text in the context of a particular life issue. Life issues are organized as tags within a life issue tag hierarchy maintained by the archive. This is described in more detail below in connection with FIGS. 2 and 3.

The spiritual community server 120 provides a social networking space to the user computer 160 organized around community spaces. Community spaces may have closed memberships to outsiders, creating social networking areas that are open only to a defined constituency. Examples include clergy spaces that are open only to clergy of a particular denomination and congregational spaces open only to known members of a spiritual congregation. Members of these communities use the spiritual community server 120 to engage with each other over spiritual issues.

The personal reflections book server 130 provides the user computing device 160 with the resources necessary to plan, document, and contemplate a personal life journey. The personal reflections book server 130 allows a user to record thoughts and actions, and plan for future actions and deeds. The personal reflections book server 130 is deeply integrated into the archive provided by the archive server 110, allowing research into the archive to place meaning on the events and beliefs recorded through the personal reflections book server 130.

The computer system 100 monitors users in all three aspects of the system 100. This allows the system 100 to track behavior and movement within the system, and to present suggestions for consideration by the users. A user struggling with a life issue using the personal reflections book server 130 could be identified by the system 100, and related ideas from the archive server 110 could be suggested to the user. Alternatively, the system could recommend conversations or other interactions maintained by the spiritual community server 120 that are related to that struggle. Paths taken by a user through the system 100 can be recorded, and outcomes of various struggles, decisions, and life events could be determined. This data could be aggregated to remove personally identifying information and then shared with other users, researchers, and educational and spiritual institutions. More information about the spiritual community server 120 and the personal reflections book server 130 can be found in the parent patent application incorporated above.

Archive Structure

Figure 2:
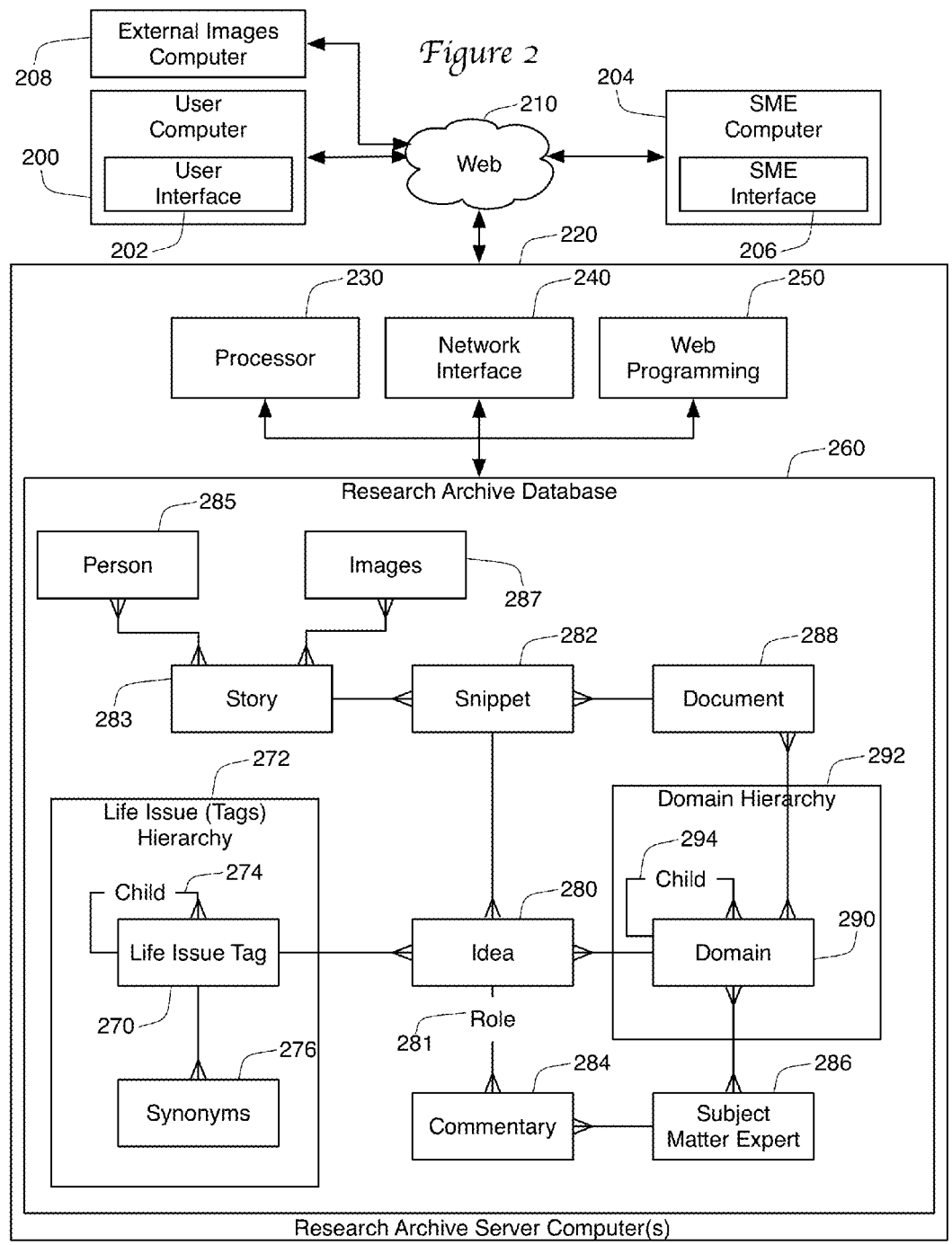
FIG. 2 is a schematic diagram showing the major components of an archive server computer.

The archive server 110 of FIG. 1 can be implemented as one or more web server computers 220 communicating with a user computer 200 and a subject matter expert computer 204 over the World Wide Web 210, as shown in FIG. 2 and FIG. 2A. The archive server computer 220 uses a processor 230, a network interface 240, and web programming 250 to provide web-based interfaces 202, 206 over the web 210. The user interface 202 provides the ability to access the research archive that is stored and managed by the archive server 220. The SME interface 206 provides the ability to alter the research archive to include the subject mater expertise of the expert using the SME interface 206. The research archive is also accessed and used by the spiritual community server 120 and the personal reflections book server 130.

In the preferred embodiment, the archive server computer 220 stores the research archive in a structured database 260. The archive can be configured to maintain data in a variety of different types of database entities, such as separate tables in a relational database, or as database objects in an object-oriented database environment. These database entities can identify data in a variety of ways, such as storing the data within the object itself, or providing a link to data that is found in a different database entity, or even by providing access to data stored completely outside of the database 260. In general, one can think of the database 260 as being stored in the memory of the research archive server computer 220 as both data and related database programming, and can think of the data being "in" or "contained by" a particular data entity, even though the actual data may only be identified by the data entities within the database 260 and be stored outside the database 260 altogether. The database programming directs the processor 230 to access, manipulate, update, and report on the data in the database 260 as further described herein. In this manner, the database programming effectively transforms the data from raw data input into new types of data based on algorithms and existing relationships. FIG. 2 shows the database 260 with tables or objects for a life issue tags 270, ideas 280, and domains 290. Relationships between the database entities, including entities 270, 280, and 290 are represented in FIG. 2 using crow's foot notation. For example, FIG. 2 shows that a life issue tag 270 may be related to (or "associated with") multiple ideas 280, but each idea 280 is associated with only a single life issue tag 270. Associations or relationships between the database entities shown in FIG. 2 can be implemented through a variety of known database techniques, such as through the use of foreign key fields and associative tables in a relational database model.

The life issue tag database entity 270 contains an identifier and a description for a particular life issue that may face an individual, such as "marriage" or "death of a parent." These database entities 270 are referred to as life issue "tags" because these are used to "tag" a particular life issue onto a different type of database entity. It would be fully acceptable to simply refer to these items of data as life issue database entities 270 without use of the word "tag."

The life issue tags 270 are organized within a life issue tag hierarchy 272 maintained by the archive database 260. This means that each tag 270 may be assigned one or more child tags 270 through the use of a child relationship 274. It is to be understood that the hierarchy 272 could be created with a parent relationship instead of a child relationship 274, or by using both child 274 and parent relationships. Within the life issue tag hierarchy 272, individual tags 270 may have a parent tag 270, one or more sibling tags 270, and one or more child tags 270.

Figure 3:
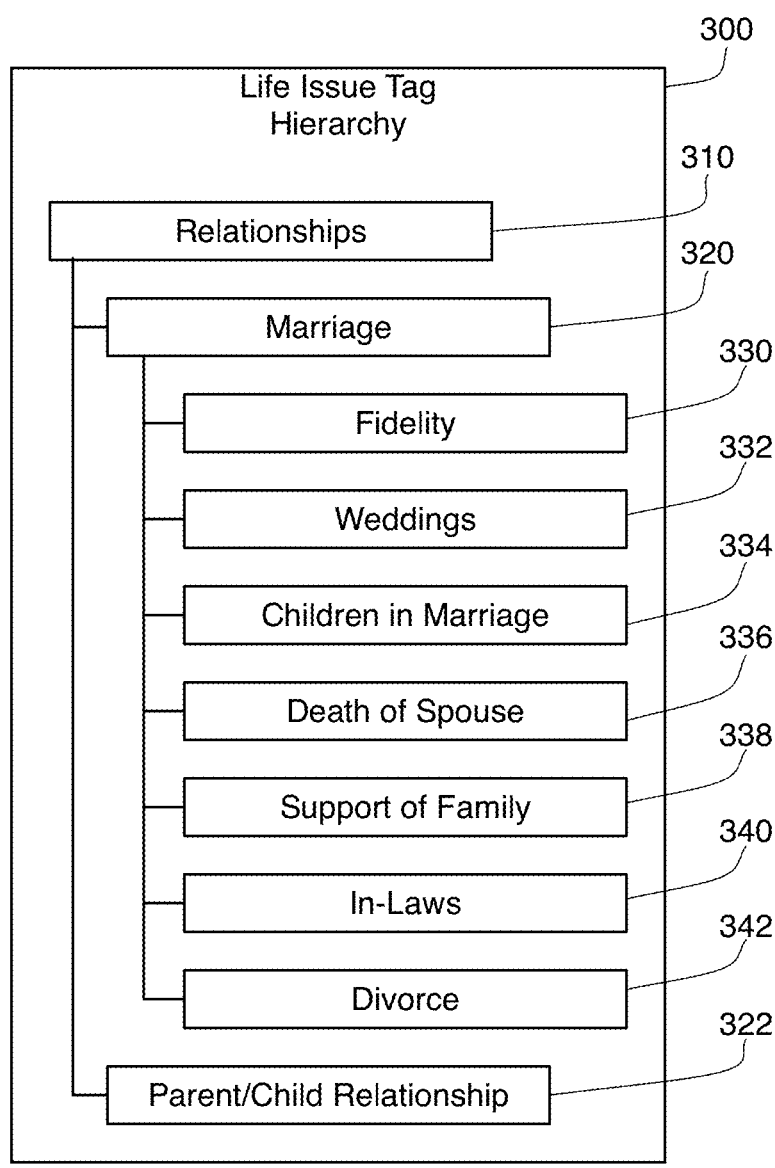
FIG. 3 is a schematic diagram showing a portion of a hierarchy of life issue tags.

FIG. 3 shows one portion of an example life issue tag hierarchy 300. In this example, tag 310 deals with the life issue of relationships. Two child tags 320, 322 of the relationships tag 310 are shown in FIG. 3, namely the marriage tag 320 and the parent/child relationship tag 322. The marriage tag 320 is itself shown with seven child tags 330-342, namely a fidelity tag 330, a weddings tag 332, a children in marriage tag 334, a death of a spouse tag 336, a support of family tag 338, an in-laws tag 340, and a divorce tag 342. In this hierarchy 300, the marriage tag 320 has one parent tag 310, one sibling tag 322, and seven child tags 330-342. The fidelity tag 330 has one grandparent tag 310, one parent tag 320, and six sibling tags 332-342. The parent 320 and grandparent tag 310 can both be considered ancestor tags of the fidelity tag 330. Similarly, all of the tags assigned reference numerals 320-342 are progeny tags of the relationship tag 310.

In one embodiment, every tag 310-342 has only a single parent tag and therefore is found in only one location in the hierarchy 300. In other embodiments, a single tag 330-342 may have multiple parents and can therefore be duplicated at multiple locations in the hierarchy 300. For example, the death of a spouse tag 336 could be a child tag to the marriage life issue tag 320, and could also be a child tag to a "death" life issue tag (not shown in FIG. 3). In some embodiments, every time a data element is associated with a life issue tag 270 it is automatically associated with the parent of that life issue tag 270, or even all ancestors of that tag 270. This association could be hard coded into the database. Alternatively, this could be accomplishing during data access, where a request for information relating to a parent tag would also automatically retrieve information relating to a child's tag. For instance, a request for information relating to the marriage tag would include information associated with the in-laws tag 340.

Returning to FIG. 2, the research archive database 260 can contain one or more synonym data base entities 276 that are associated with each life issue tag 270. This allows the user interface 202 to accept a key word search for a particular life issue tag 270. The content of the life issue tag entities 270 and the synonym entities 276 can then be searched for occurrences of those key words. If the key words were not found in the title or description of any of the life issue tags 270 but were found in the synonyms 276, the appropriate life issue tags 270 could still be identified by identifying the life issue tags 270 associated with the found synonyms 276. This is described in more detail below in connection with FIG. 6.

Figure 4:
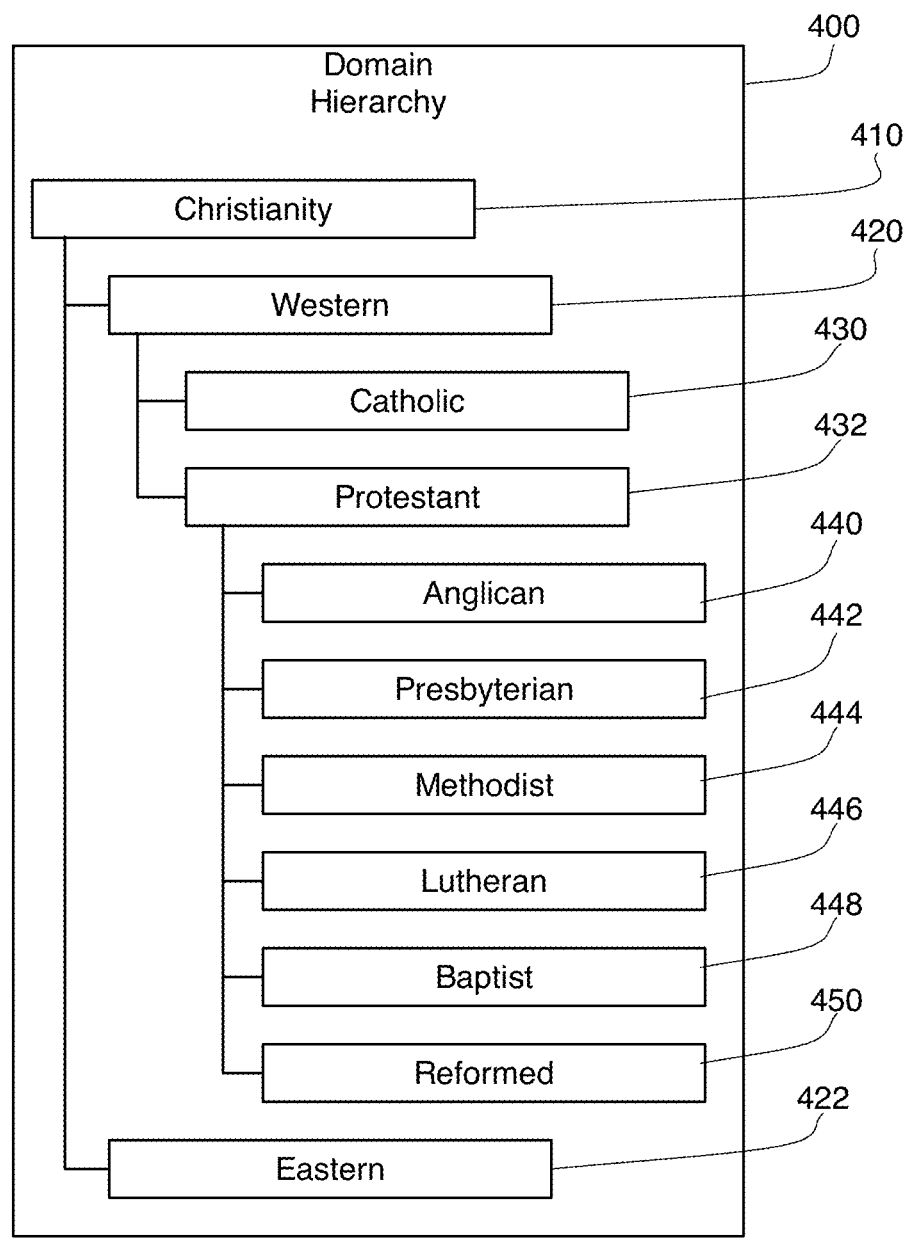
FIG. 4 is a schematic diagram showing a portion of a hierarchy of domains.

The idea database entities 280 each reference a single snippet or quotation 282 from a spiritual text document 288 that is considered a foundational document for one of the domains 290 of the archive database 260. The domains 290 are categorizations of spiritual or religious bodies or groups of believers, such as Sufism, Southern Baptist, or Catholic. Domains are identified through the domain database entity 290. As was the case with life issue tags 270, the archive database 260 maintains a hierarchy of domains 292 by assigning a child relationship 294 between one domain and another. FIG. 4 shows one portion of an example domain hierarch 400. The top domain 290 shown in this section of the hierarchy 400 is Christianity 410. This domain 410 has two children, namely western Christianity 420 and eastern Christianity 422. Western Christianity 420 has two child domains 290 in hierarchy 400, namely Catholic 430 and Protestant 432. The Protestant domain 432 itself has six children, namely Anglican 440, Presbyterian 442, Methodist 444, Lutheran 446, Baptist 448, and Reformed 450. Each of these children domains 440-450 could itself be a parent domain 290 for other recognized religious domains 290. As was the case with the life issue tag hierarchy 300, domains 410-450 in the domain hierarchy 400 can have ancestor domains (parents, grandparents, etc.) and progeny domains (children, grandchildren, etc.).

FIG. 2 shows that each domain 290 is associated with a plurality of spiritual documents 288, with the documents 288 that are associated with a single domain 290 constituting the "corpus" for that domain 290. These documents 288 were selected by subject matter experts using interface 206 as a representative group of spiritual documents 288 for that domain 290. Not surprisingly, the documents 288 can be assigned to multiple domains 290, as numerous religious and spiritual domains 290 share spiritual documents 288 with other domains 290. Each snippet 282 is a quotation or an excerpt from a spiritual document 288. Every document 288 can have multiple snippets 282, but every snippet 282 is taken from only one document 288.

Each idea 280 is associated with a single life issue tag 270, with a single domain 290, and with a single snippet 282 that is taken from a document 288 associated with that domain 290. Consequently, although each idea 280 is related to only a single life issue tag 270, snippet 282, and domain 290, multiple ideas 280 can exist for a single life issue tag 270, snippet 282, or domain 290. Each idea 280 is also associated with a set of commentaries 284. These commentaries are written by subject matters experts, each of whom is identified and tracked through a subject matter expert database entity 286. Each subject matter expert is an expert on at least one religious or spiritual domain 290, as indicated by the relationships between database entities 286, 290 shown in FIG. 2. The subject matter experts write the commentaries 284 on the snippet 282 for an idea 280 from the point of view of the idea's domain 290. These commentaries 284 also reflect on how the snippet 282 relates to the life issue tag 270 assigned to that idea 280. Each of the set number of commentaries 284 associated with an idea 280 are written in the context of a particular approach to the related domain 290 as indicated by the role 281 assigned to that commentary 284. For instance, five commentaries 284 on the snippet 282 could be written from the point of view (or role 281) of i) a historical analysis approach within the domain 290, ii) a traditional approach within that domain 290, iii) a moderate approach within the domain 290, iv) a modern approach within the domain 290, and v) a comparative approach comparing the understanding of the associated domain 290 with other domains 290. In the preferred embodiment, all ideas 280 in the archive database 260 contain the same number of commentaries 284 (such as four, five, or six) on the snippet 282, with the commentaries 284 all written from the same four (or five or six) different roles 281. The roles 281 can be implemented in a variety of ways, such as by identifying the role 281 in the database structure that creates the relationship between the idea 280 and the commentary 284. Alternatively, the commentary database entity 284 could contain data identifying its role, or the idea database entity 280 could be constructed to have separate, single relationships defined for each of the possible roles 281.

In the preferred embodiment, the subject matter experts write their commentaries through the SME computer interface 206. In another embodiment, the computerized system may allows users to input user-commentaries into the system using the user interface 202. These commentaries would be distinguished from the SME commentaries, as they might not be as useful/reliable as the commentaries 284 created by experts. However, user-created commentaries could be very useful in filling out the database 260 while subject matter experts are still drafting up their own expert commentaries. The user-generated commentaries could be identified with particular users within the database 260. Furthermore, other user's could review, comment on, and rate the user commentaries. Users that have received positive comments and ratings for their commentaries would be identified, and their user-generated commentaries would be given more prominence with the computerized system 100. In most cases, the user-generated commentaries can be treated the same as expert commentaries. For the purpose of simplifying this description, the remainder of this description will generally assume that the commentaries 284 in database 260 are generated by subject matter experts.

It is important to note that a document 288 will frequently take the form of a translation of an ancient text, and that competing translations of a text can exist within a single domain 290. These translations can be represented as separate documents 288 in the domain 290, or else might be collected within the research archive database 260 as a single document 288 with multiple translations. If multiple translations exist within a single document 288, each snippet 282 from that document 288 may also have multiple translations. Users may elect to be shown only a single translation when using the system. For instance, the user could specify that only the most recent English translation be shown, or that the "New Revised Standard" or "King James" versions of the Bible be used. Alternatively, a user may elect to be shown multiple translations simultaneously. Commentaries 284 on the snippet 282 may relate to all translations, or an expert may elect to focus their commentary 284 on a particular translation.

In some embodiments, the research archive database 260 relates snippets 282 with stories 283. A snippet 282 may tell all or part of a story or incident in the religious document 288, and these stories are identified and tracked in the story database entities 283. In some religious documents, the same story is actually told in multiple locations within a document 288. For instance, the Christian Bible relates the story of the birth of Jesus in both the Gospel of Matthew and the Gospel of Luke. All snippets 282 within the documents that retell this event are associated with the story database entity 283. This is true even though the snippets will likely tell different versions of the same story, since each snippet 282 for that story 283 will generally involve the same or a similar group of persons and relate to the same general event.

In one embodiment, a separate database element 285 is used to identify and contain data about particular individuals that are described in (or are authors of) the religious documents 288. In FIG. 2, the persons 285 database entities are used to track this information. The associations shown in FIG. 2 show that a person database entity 285 can be associated with one or more stories. For instance, this database entity 285 may indicate that Mary, Joseph, and Jesus were individuals associated with the story of the birth of Jesus. The database 260 may also track less identifiable individuals that are associated with the story, including the wise men and the shepherds, as well as other individuals that are associated with but not present at the story, such as the angel Gabriel and King Herod.

The research archive database 260 is also able to include information concerning religious images that may portray or otherwise interpret events, parables, or other descriptions in the religious documents 288. These images are tracked (and may be stored within) image database entities 287. As shown in FIG. 2, the images 287 tracked in the database 260 are associated with stories 283, and as such are also affiliated with snippets 282 of religious documents 288. If the same story 283 is found in two locations in the same document 288, or in two different documents 288 within a religious domain 290, the image depicting that story will be automatically associated with those locations and documents 288 using the data structure set forth in FIG. 2. In the preferred embodiment, the actual images referred in by database entities 287 with be digital recreations or copies of artwork created by professional and historical artists. For instance, a digital version of Leonardo da Vinci's "Last Supper" may be one of these images. The actual digital version may be stored in the research archive database 260, or may be stored on an external computer or server such as the external images computer 208 shown in FIG. 2. When the image is stored external to the research archive server computer 220, the images database entity 287 will include a link that addresses that image over network 210. Note that the external images computer 208 does not have to be owned by, or even managed by, the owner or manager of server computer 220. As long as copyright issues are sorted out, the images can be stored in thousands of different external image computer 208 that are each individually owned and operated. Links (such as URLs) to the images are stored in the database 260, and the actual image is downloaded directly from the external image computers 208 directly by the user computer 200.

The person database entities 285 and the images database entities 287 are shown in FIG. 2 as being associated with the stories entities 283, which is a useful way to link persons and images to the stories found in the religious documents. Although it is not shown in FIG. 2, it would also be possible to add additional linkages, between these and other database entities shown in database 260. For instance, each image 287 could directly identify the individuals 285 that are portrayed in the image, as well as the individual or individuals that have been credited for creating the image. Snippets 282 and/or Documents 288 could also be directly linked to persons 285 to reflect the subject of the snippet 282 or document 288, or to reflect and author or editor of the snippet 282 or document 288. The use of the person 285 database entities allows connections between individuals (famous person database entities 285) referenced or alluded to in spiritual documents 288 to be shown to a user. As a result of the image database entities 287, images that depict a snippet 282 being studied could also be simultaneously viewed by the user. In the preferred embodiment, the person database entities 285 are also internally linked to each other in such a way as to reflect direct relationships between persons in the database. These internal relationships between different person database entities 285 may reflect familial relationships (parent/child), mentoring/student relationships, adversarial relationships, etc. To do so, the relationships contain role values to better define the relationship.

Figure 5:
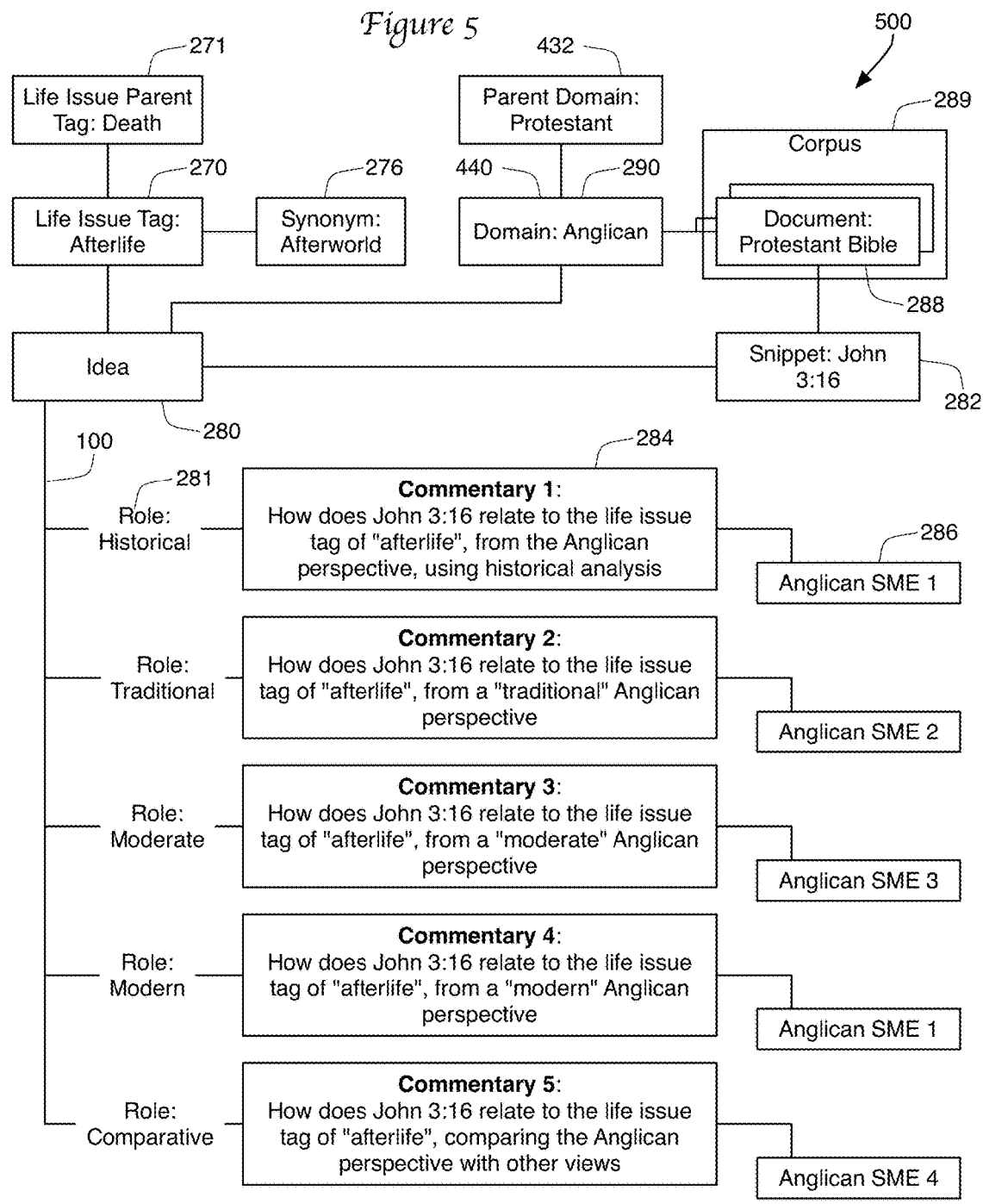
FIG. 5 is a schematic diagram showing an example idea in the context of the related database entities.

FIG. 5 shows some example data 500 in the research archive database 260. In this case, a single idea 280 is diagrammed. This idea 280 is associated with the life issue tag 270 of "afterlife." This life issue tag 270 is in a life issue hierarchy 272, and is shown as a child of the parent tag "death" 271. A synonym 276 has been assigned to the life issue tag 270, in this case allowing searches for the word "afterworld" to be associated with the life issue tag afterlife 270. The idea is also associated with a snippet 282, in this case chapter 3, verse 16 of the Gospel of St. John. This snippet 282 is taken from a document 288, in this case the protestant Bible. This document 288 is associated with a particular domain 290, in this case the Anglican domain 440, which is a child of the Protestant domain 432. Note that a snippet 282 does not need to be limited to a single verse—a snippet can be of a variety of lengths, which means that a snippet from the Bible can be less than a verse, can be multiple chapters, or could be an entire book in the Bible.

The idea 280 in FIG. 5 contains five commentaries 284 that provide expert commentary on the snippet 282. All of the commentaries 284 are written from the point of view of the Anglican domain 290, and all of the commentaries 284 reflect on how this snippet 282 relates to the life issue 270 of the afterlife. The five commentaries differ in their roles 281, approaching the same question from the five predefined roles: i) an Anglican historical analysis approach, ii) a traditional Anglican approach, iii) a moderate Anglican approach, iv) a modern Anglican approach, and v) a comparative approach comparing the Anglican understanding with other domains 290. While separate subject matter experts can be assigned to each of these roles, it is also possible that a single subject matter expert writes commentaries for multiple roles.

Of course, the table or object entities shown in FIGS. 2-5 should not be considered to show actual implementation details of the database 260, since it is well within the scope of the art to implement this type of data using a variety of entity architectures. The entities shown are exemplary, intended to aid in the understanding of the data maintained by the system database 260 in this embodiment. It is not even necessary to implement these entities as formal tables or objects, as other database paradigms could also effectively implement these types of data structures. Throughout the remainder of this disclosure, the content and interrelationship of database structures will continue to be explored using these example data structures, but these structures should not be considered to limit the way in which these databases can be constructed.

Searching and Displaying of Results

Figure 6:
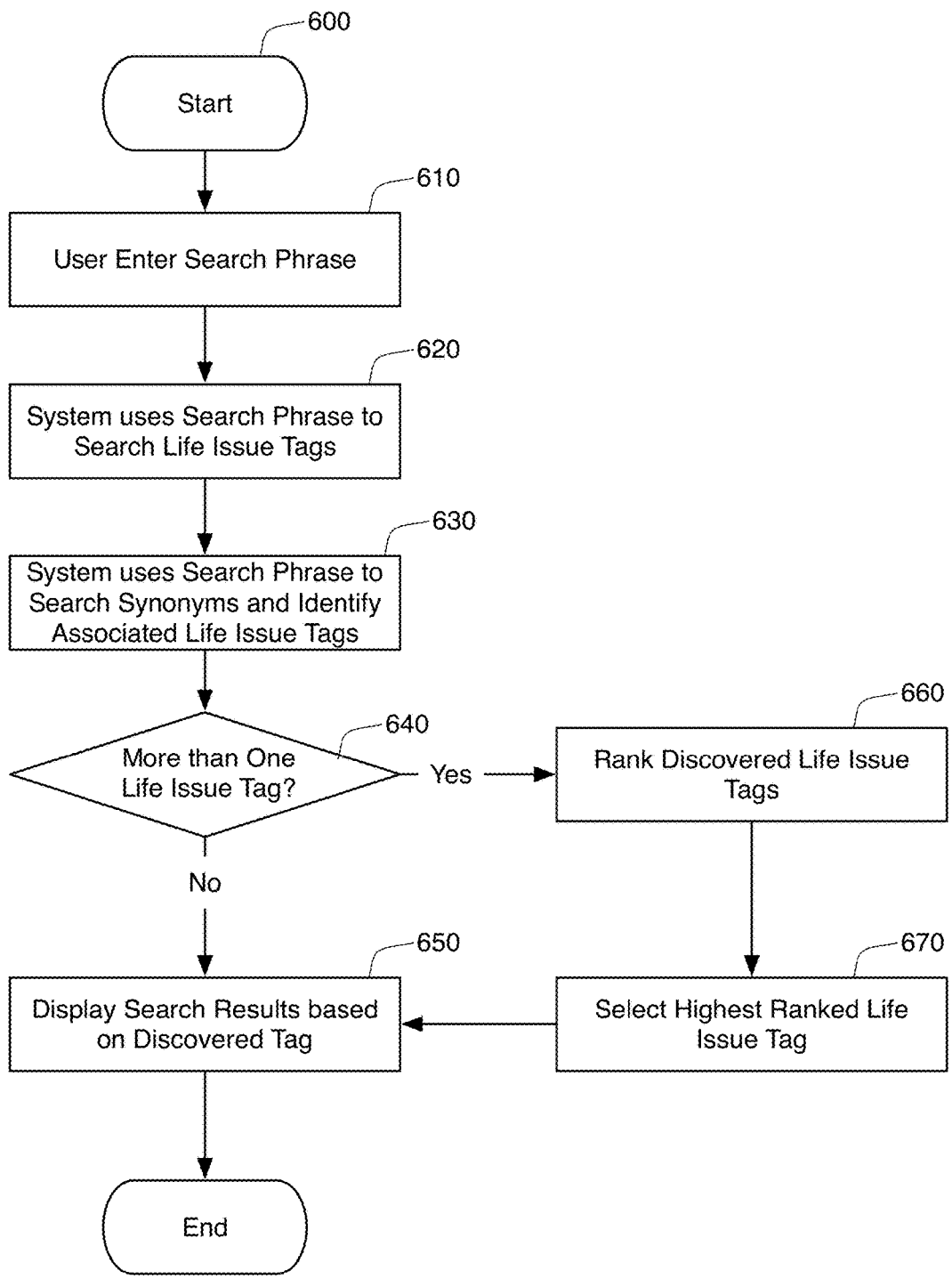
FIG. 6 is a flow chart showing a system of the creation of new synonyms based on user interaction.

One benefit of this construction of the archive database 260 is that it is possible to research the ideas 280 and document snippets 282 by identifying a life issue tag or tags 270 of interest. FIG. 6 shows a process 600 by which a user can enter a search phrase and find related ideas 280, document snippets 282, stories 283, persons of interest 285, images 287, and commentaries 284, and even if the words used in the search phrase were not found in any of these elements 280, 282, 283, 285, 287 and 284. The process 600 starts at step 610 where a user enters a search phrase using the user interface 202 provided by the research archive server computer 220. The server computer 220 then uses the search phrase to identify life issue tag database entities 270. These database entities 270 may contain one or more fields that define a life issue tag, such as a life issue tag name (e.g., "marriage") and a life issue tag description ("this tag relates to issues concerning two people joined together in marriage"). Step 620 can search all fields in the life issue tag database entity 270 for a match to the search phrase.

Figure 7:
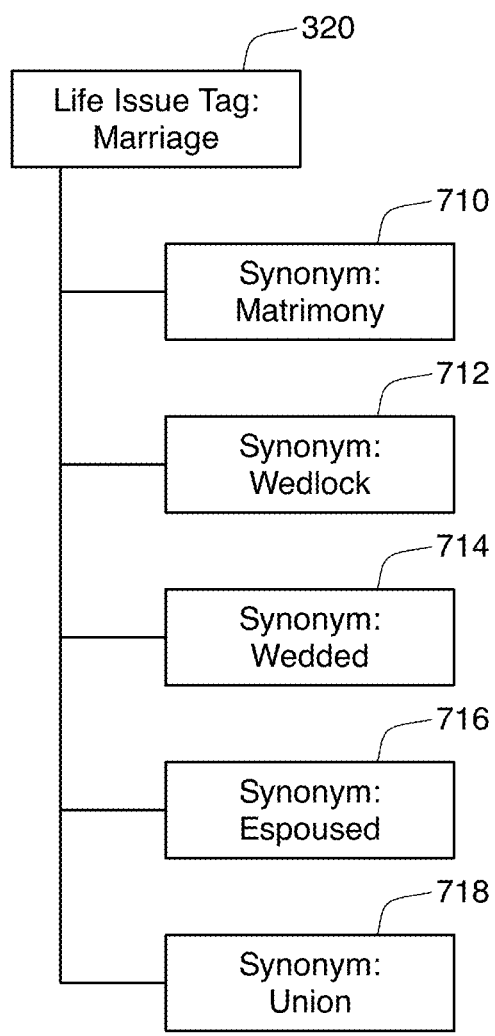
FIG. 7 is a schematic diagram showing related synonyms for a life issue tag along with suggested synonyms to be presented to a subject matter expert.

At step 630, the synonym database entities 276 are then compared to the search phase to find matching synonyms. If a match is found between the search phrase and the synonyms 276, then the related life issue tag 270 is identified for the matching synonym 276. For example, FIG. 7 shows five synonyms 710-718 that have been assigned in the database 260 to the life issue tag of marriage 320. Using these synonyms 710-718, a search phrase that includes any of the words "matrimony," "wedlock," "wedded," "espoused," or "union" would be linked to the life issue tag 320 of "marriage."

Figure 8:
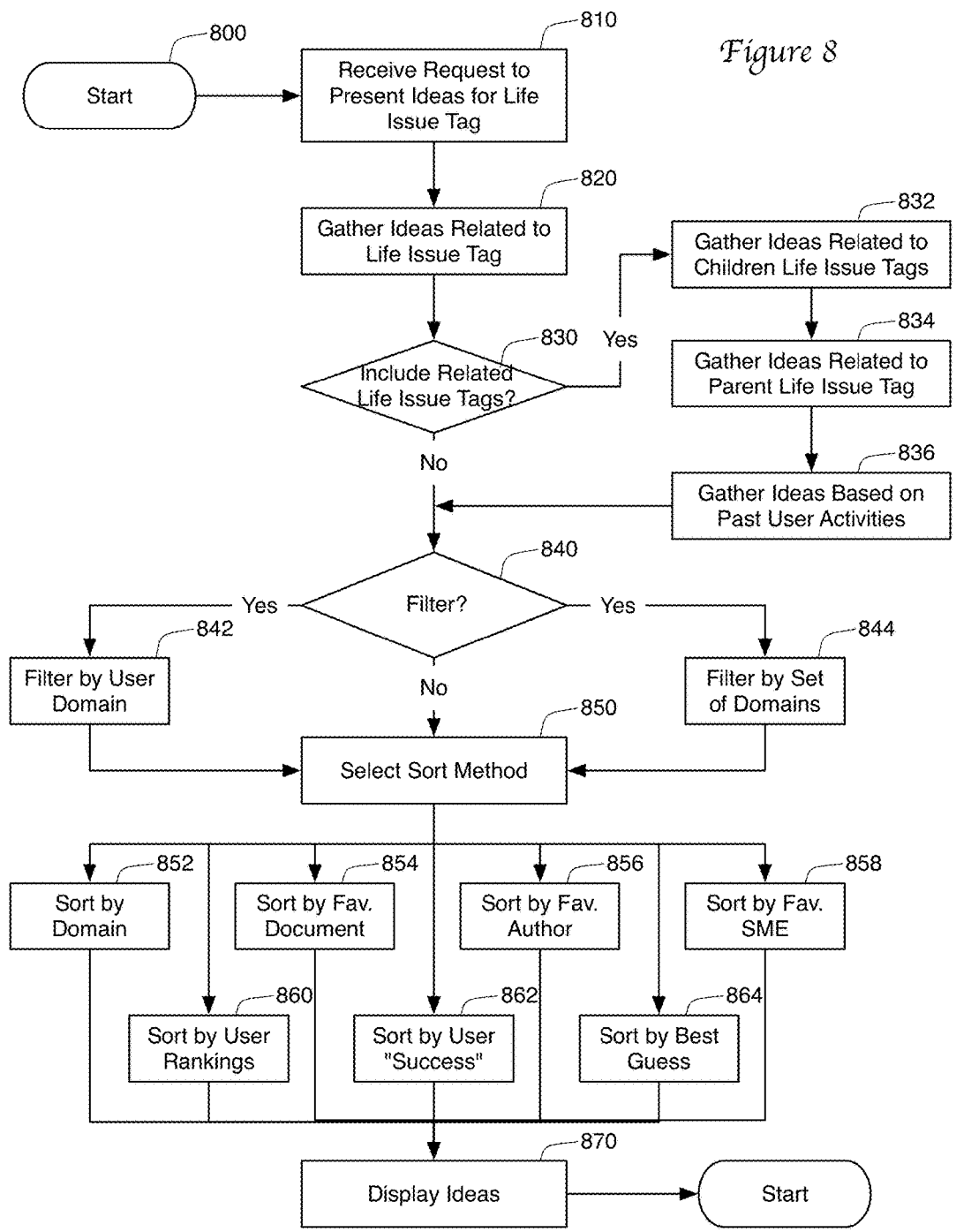
FIG. 8 is a flow chart showing a method of searching for and presenting ideas from a research archive.

At step 640, the total number of life issue tags 270 found through steps 620 and 630 are identified. If only one life issue tag 270 was identified, then the process continues at step 650 where the results for the one discovered life issue tag 270 displayed to the user interface 202. These results include the presentation of the identified life issue tag 270 within its location in the life issue tag hierarchy 272, as well as a listing of idea database entities 280 that are associated with that life issue tag 270. One process 800 for selecting and organizing these idea database entities 280 after a search is shown in FIG. 8 and described below. If more than one life issue tag 270 were identified by the by step 640, it would be possible to simply list all of the identified life issue tags 270 and allow the user to select their desired tag 650. Process 600 operates differently, in that the discovered life issue tags 270 are ranked according to a ranking algorithm at step 660, and then the highest ranked tag 270 in the ranking is identified at step 670 for use in the display step 650. The ranking algorithm used in step 660 can use a variety of ranking algorithms that are known in the prior art. For instance, the tags 270 could simply be ordered in terms of their popularity. Tags 270 that are viewed more frequently than other tags 270 by the users of server computer 220 would be ranked higher than others. More sophisticated algorithms could also be used, such as algorithms that track the activities and behaviors of previous users who have submitted similar search phrases to determine which results have been most useful to users.

FIG. 8 shows a process 800 for gathering, filtering, and sorting idea database entities 280 that are associated with a particular life issue tag 270. Process 800 begins with step 810, in which a request to present ideas 280 for a particular life issue tag 270 is received. This request can come from process 600, which includes a step to display the ideas 280 associated the found life issue tag 270 at element 650. This request can also come from other aspects of the user interface 202, as is described below.

Using the associations (or "relationships") established by the database 260 between life issue tags 270 and ideas 280, the process 800 can easily identify those ideas 280 associated with the identified life issue tag 270 in step 820. In some circumstances, it may be helpful to gather additional ideas 280 beyond those that are directly associated with the identified life issue tag 270. If these additional ideas 280 are to be gathered, as determined by step 830, step 832 identifies children life issue tags 270 of the identified life issue tag 270, and then identifies the ideas 280 that are associated with these children tags. Similarly, step 834 identifies parent life issue tags 270 and identifies ideas 280 associated with these parent tags 270. In step 836, the system 100 uses an analysis of past user behaviors in order to predict other life issue tags 270 that may be of interest to a user. For instance, the system may have identified a pattern showing that users that research "marriage", "fidelity," and "divorce," life issue tags also frequently research ideas 280 related to the life issue tags 270 of "anger" and "reconciliation." By analyzing the current user's research behavior, the system 100 may identify these other tags 270 that may be of interest. These system-identified tags 270 can then be used at step 836 to identify additional ideas 280 for presentation to the user.

At step 840, the process 800 determines whether the gathered ideas 280 are to be filtered according to the domains 290 that are assigned to each idea 280. In some circumstances, no filtering will be done and the process 800 continues to the sorting steps 850-864. In other circumstances, a user may have self-identified themselves to the system 100 as a believer or practitioner of a particular spiritual or religious domain 290. If the user desires, their research of the archive database 260 will be limited only those ideas 280 that are associated with the user's chosen domain 290. In this circumstance, step 842 will filter the ideas 280 to include only those associated with the user's domain 290. In other circumstance, multiple domains 290 will be acceptable to a user but the user does not desire all domains 290 to be included in their research. For example, a self-identified Anglican may desire to include ideas associated with child domains 290 of the Anglican domain, which may include an Episcopal Church of the USA domain 290, a Church of England domain 290, an Anglican Church of Australia domain 290, and numerous other domains 290. Step 844 will filter the gathered ideas 280 according to the user selected plurality of domains 290. In some embodiments, ideas 280 associated with child domains 290 are automatically associated with parent domains 290, such that all ideas 280 associated with any Christian domain 290 would be selected if a user elected to view ideas associated with the Christianity domain 290. Step 844 may also be used to filter ideas 280 against multiple, unrelated domains 290. For instance, a self-identified "Anglican" may indicate in their preferences that they also wish to review ideas 280 stemming from two unrelated spiritual disciplines each having their own domain 290.

At this step 850, the process 800 selects one or more sorting methods 852-864 to sort the remaining ideas 280 so as to give preferences to those ideas 280 that are most likely to be of interest to the user. For example, if the user did not filter the ideas 280 by domain 290 but nonetheless indicated a preference for one or more particular domains 290, the ideas 280 could be sorted according to those preferred domains 290 at step 852. These preferences could have been manually set by the user using the user interface 202, or could have been identified by the system 100 by tracking past user behavior. For example, a user that has previously only viewed ideas in the Anglican domain 290 and the New Age Mysticism domain 290 would have the ideas 280 sorted at step 852 so that ideas 280 in those identified domains 290 appear first in the result list presented to the user. In the same way, a user could indicate a preference for a particular document (e.g., the protestant Bible), a favorite author (Martin Luther), or a favorite subject matter expert that writes commentaries 284 for ideas 280, which could cause the process 800 to sort the ideas by that document (step 854), author (step 856), or subject matter expert (step 858). In addition, the system 100 could allow users to rate particular ideas 280, and can then sort the ideas 280 at step 860 in order to present the ideas 280 in order of their user ratings.

At step 862, the system 100 attempts to assign determine whether users searching the archive database 260 have achieved a successful outcome. A successful outcome may mean that the user repeatedly returns to the same idea 280 when researching a life issue tag 270, or that the user quoted content from an idea 280 in contributions that the user made to the spiritual community server 120 or the personal reflections book server 130. However success is measured, the system 100 can identify ideas 280 that have helped users reach a successful outcome, and then sort the resulting ideas 280 according to that success measurement.

Finally, the system 100 can attempt to create a best guess of those ideas 280 that would be most useful to the current user and then present those ideas 280 first in the user interface 202. Step 864 differs from step 862 in that step 862 tried to determine which ideas 280 were most successful to all users, while step 864 attempts to determine the best ideas 280 for the particular user that will view the result. In one embodiment, step 280 first determines relevant life issue tags 270 and domains 280 for a user, either through user-set preferences or by watching user interaction with the system. The system then identifies previous users that shared these life issue tags 270 and domains 280 and determines which ideas 280 were most popular or useful to these previous issues and then sorts the ideas 280 accordingly.

There is no need to use only a single one of these identified sorting techniques 852-864. Multiple techniques 852-864 could be combined to create a primary and secondary sort for the ideas 280. Once the ideas 280 are sorted, the sorted ideas 280 are presented to the user through the user interface 202 at step 870, which is described in more detail in connection with FIG. 9.

Presentation on the User Interface

Figure 9:
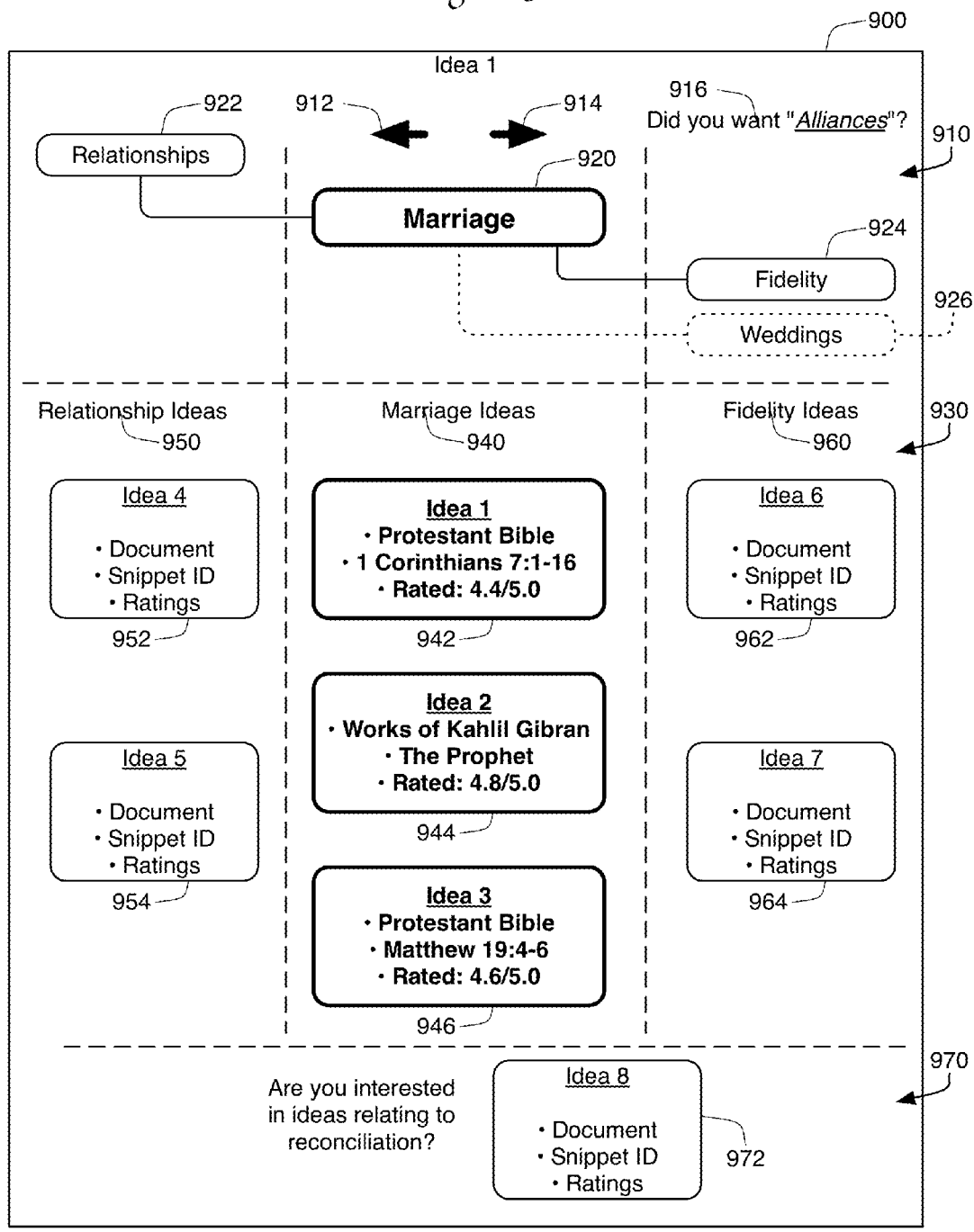
FIG. 9 is a schematic diagram showing a user interface for presenting ideas in response to a search.

In response to a search request by a user, a life issue tag 270 is identified through process 600, and then ideas 280 associated with the identified life issue tag 270 are gathered, filtered, and sorted in process 800, and the results are presented to a user such as through user interface 900 shown in FIG. 9. This interface has three main parts: a life issue hierarchy portion 910 that is responsible for displaying the selected life issue tag 270 in the context of its tag hierarchy 272, a related idea presentation portion 930 that presents sorted ideas 280 that are associated with the selected life issue tag 270 and perhaps related tags 270 in the tag hierarchy 272, and a best guess portion 970 that presents ideas 280 that are not directly related to the presented life issue tag 270 but may be of interest to the user.

The life issue hierarchy portion 910 shows the identified life issue tag 270 from method 600. In this case, the identified tag is the marriage tag 920. In interface 900, this tag 920 is placed in the center of the life issue hierarchy portion 910 and is emphasized such as through the use of bolded or larger text. This emphasis lets the user understand that this interface 900 is centered on the life issue tag of marriage 920. The tag hierarchy portion 910 of interface 900 includes not only the identified tag 920, but also the parent of this tag (the relationships tag 922) and at least one child tag (the fidelity tag 924). In some embodiments, all children tags are shown in the life issue hierarchy portion 910 of the user interface, as is indicated by showing a second child tag (the weddings life issue tag 926) in dotted lines on FIG. 9. In order to show numerous children tags 924, 926 of the selected tag 920, it is sometimes helpful to design the interface 900 such that the tag hierarchy is positioned vertically along the left side of the interface 900 as opposed to horizontally on the top side of the interface 900 as shown in FIG. 9.

By presenting the life issue hierarchy portion 910, a user is able to directly traverse the life issue tag hierarchy 272 starting at the life issue tag 920 selected by their search. In one embodiment, the user simply clicks on the desired life issue tag 270 shown in portion 910 and interface 900 is refreshed with the chosen tag 270 becoming the centered, identified tag 920 of the interface 900. The user can traverse up and down the hierarchy 272 without selecting a particular tag 270 using the arrows 912, 914 included in interface portion 910.

Sometimes a user's search phrase will identify more than one life issue tag 270. As discussed above, method 600 will then rank the tags and select the most likely tag in steps 660 and 670. For example, an individual might have searched on the word "unions." This word was identified as a synonym 718 of the life issue tag "marriage" 320 as shown in FIG. 7. However, it is possible that the same word "union" was also considered a synonym for the life issue tag of "alliances." While method 600 ranked the tags 270 and selected the marriage tag 920 as the preferred tag 270 to display on interface 900, the interface 900 may present the user with the opportunity to select the un-selected tag. This is done with question 916, which allows the user to automatically select the alliances life issue tag 270 and refresh interface 900 around that tag.

The related idea presentation area 930 is shown in FIG. 9 with three columns 940, 950, 960 of ideas. The main column 940 is placed in the center of interface 900 directly underneath the identification of the main life issue tag 920 for interface 900. The ideas 942, 944, 946 in this column 940 are emphasized to let the user know that these ideas 942, 944, 946 relate directly to the marriage life issue tag 920. These ideas 942-946 have been gathered, filtered, and sorted according to process 800. As shown in FIG. 9, these ideas 942, 944, 946 are not presented in their entirety (which would include the text of the snippet 282 and the commentaries 284 on the snippet 282). Rather, the interface 900 in FIG. 9 identifies each idea 942, 944, 946 by disclosing the document 288, a citation or other identifier for the snippet 282, and a user rating for that idea 280. In other embodiments, language from the snippet 282 could be included in FIG. 9 to allow the users to read all or part of the snippet 282 before viewing the entire idea 280.

The first column 950 in the idea presentation area 930 shows ideas 952, 954 that are associated with the parent life issue tag 922 of "relationships." Again, interface 900 merely provides some information about these ideas 952, 954 without displaying the entire idea 280 (including the snippet 292 and the commentaries 284). Because these ideas 952, 954 are not associated with the main life issue tag 920 of the interface 900, these ideas 952, 954 are generally deemphasized when compared with the more central ideas 942, 944, 946 relating to marriage 920. The third column shows ideas 962, 964 associated with one of the children tags, in this case the "fidelity" life issue tag 924. By including columns 950, 960 of ideas 952, 954, 962, 964 of that are not directly related to the central life issue tag 920, the user is able to obtain a broader picture of the ideas 280 that are accessible through related life issue tags 922, 924. This encourages the user to explore the life issue tag hierarchy through hierarchy interface portion 910 by manually traversing the hierarchy 272, which will allow the user to more quickly focus in on the exact life issue tag 270 that they desire.

As explained above in connection with step 836, the system 100 may gather ideas 280 for presentation to the user that are not based on a selected life issue tag 270 and its neighbors in the tag hierarchy 272, but instead are based on its analysis of the behavior of other users that have characteristics similar to the current user. This allows the system to suggest an idea 280 that is associated with a "reconciliation" life issue tag even though the user has only researched the "marriage", "fidelity," and "divorce," life issue tags 270. In interface 900, this best guess idea 972 is presented to the user in interface portion 970. This portion 970 is best separated from the related idea presentation portion 930 so that users do not believe that the idea 972 is connected directly to the identified life issue tag 920.

Figure 10:
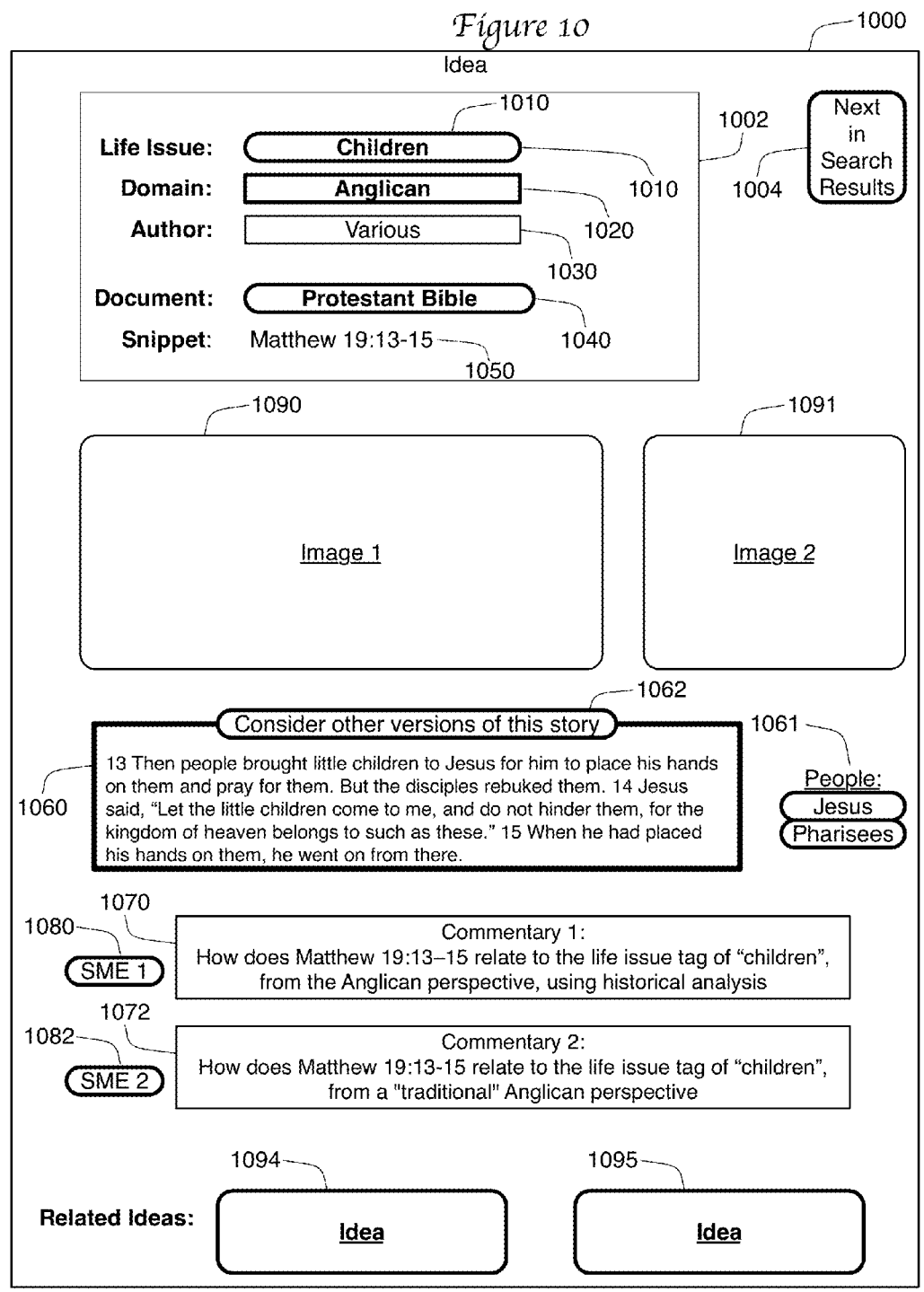
FIG. 10 is a schematic diagram showing a user interface for presenting an idea within its research archive context.

A user may select any of the ideas 942-946, 952-954, 962-964, and 972 for more detailed study in the idea user interface 1000 shown in FIG. 10. This interface 1000 presents both a single idea 280 but also information about the context 1002 of the displayed idea 280, including the life issue tag 270 and domain 290 assigned to the idea 280; as well as persons 285, stories 283 and/or images 287 related to the idea. In this case, the life issue tag is "children" 1010 and the domain is "Anglican" 1020. In some embodiments, the life issue tag 1010 is presented within its context of the life issue tag hierarchy 272, showing the parent tag ("family") and its children tags. Similarly, the domain tag 1020 can also be shown in the context of the domain hierarchy 292 including the parent domain ("Protestant") and children domains, although this is not shown in FIG. 10. The context 1002 of the idea 280 also includes an identification of the document 288 from which the snippet 282 was taken. In this case, the document 288 is the Protestant Bible (1040), and the snippet is the Gospel of St. Matthew, Chapter 19, verses 13-15 (1050). Frequently the spiritual documents 288 in the archive database 260 have known authors, so the context information 1002 also identified the author 1030 for the document 1040.

The rounded icons shown in the context of FIG. 10 indicate that a user may select these icons and go to related information. For instance, the user can select a life issue tag 1010 and go to interface 900 for that life issue tag. Alternatively, the user could select the document icon 1040 and view the entire contents of the document 1040.

As shown in FIG. 10, the interface displays the text of the snippet 1060. This snippet 1060 is associated in the database with a story database entity 283 that is also told in other snippets 282 from other locations in the same document 288 or the same domain. The interface 1000 identifies this to the user by including a link 1062 that, if followed by the user, will then display all of the snippets 282 associated with this story 283.

The interface 1000 also can display famous works of art or other images 1090, 1091 that are identified in the images 287 database entities as being related to this story 283. These images 1090, 1091 can be retrieved from the database 260 or retrieved from the external images computer 208. Alternatively, links to the images found on the external images computer 208 can be provided if any necessary rights to display the images in interface 1000 cannot be obtained. Likewise, persons of interest 285 mentioned in or otherwise associated the snippet 282 and story 283 may be highlighted directly within the snippet (not shown in FIG. 10), or presented to the user in the form of additional links 1061. These links serve not only to inform the user of the persons of interest in the snippet 1060, but also provide links to additional information about those persons stored in the database 260 within the persons database entities 285. The links may take the form of URL links to web pages (or similar documents accessible through the URL) that describe the person, link to snippets where the person is mentioned, or describe relationships involving that person (see FIG. 14 and accompanying text).

Users may view interface 1000 after selecting an idea 280 from the search results interface 900. In that case, an icon 1004 on the idea interface 1000 may allow the user to move easily to the next idea 280 discovered in the search results shown in interface 900.

Interface 100 presents the full text of the snippet 1060, and then presents the commentaries 1070-1074 that comment on this snippet 1060 in the context of this life issue 1010 for this domain 1020. As explained above, commentaries 284 are preferably associated with pre-defined roles 281, with each idea 280 containing a similar set of commentaries 284 having the same roles 281. In FIG. 10, only two commentaries 1070-1072 are shown. However, if the database 260 were established with a set number of roles 281, such as four, five, or six, then interface 1000 would present commentaries for all of the set number of roles 281. Each commentary 1070, 1072 is written by a subject matter expert using interface 206. These SMEs are identified through icons 1080 and 1082, so that users may identify the expert that writes the commentaries 1070-1074. The icons 1080-1082 themselves can be selectable by the user so that the user can go directly to related ideas that contain commentary by the same subject matter expert. Ideally, these icons 1080-1082 would also identify the subject matter expert, such as by name.

Although interface 1000 is designed to allow users to view a single idea 280, it is possible that the system 100 might suggest additional ideas 270 for study by a user based on their past interests and history using the system 100. These suggested ideas 1094, 1095 could be presented at the bottom of the interface 1000. If selected by a user, the interface 1000 would be refreshed to show the selected idea 1094 or 1095.

While the interfaces 900, 1000 shown in FIGS. 9 and 10 illustrate how a user can select from multiple ideas 280 through searching and traversing a life issue tag hierarchy 300, in some cases a user may wish to review ideas 280 and commentaries 284 while reviewing a particular spiritual text 288. As seen in the data relationship structure illustrated in FIG. 2, documents 288 are associated with a plurality of snippets 282 that constitute a quotation or excerpt from the document 288. Each snippet 282 is, in turn, associated with one more ideas 280, each of which can have one or more commentaries 284 written by subject matter experts 286. The ideas 280, and hence the commentaries 284 associated with those ideas 280, are in turn associated with a religious or spiritual domain 290. In addition, snippets 282 are associated with persons 285, stories 283, and images 287.

Figure 11:
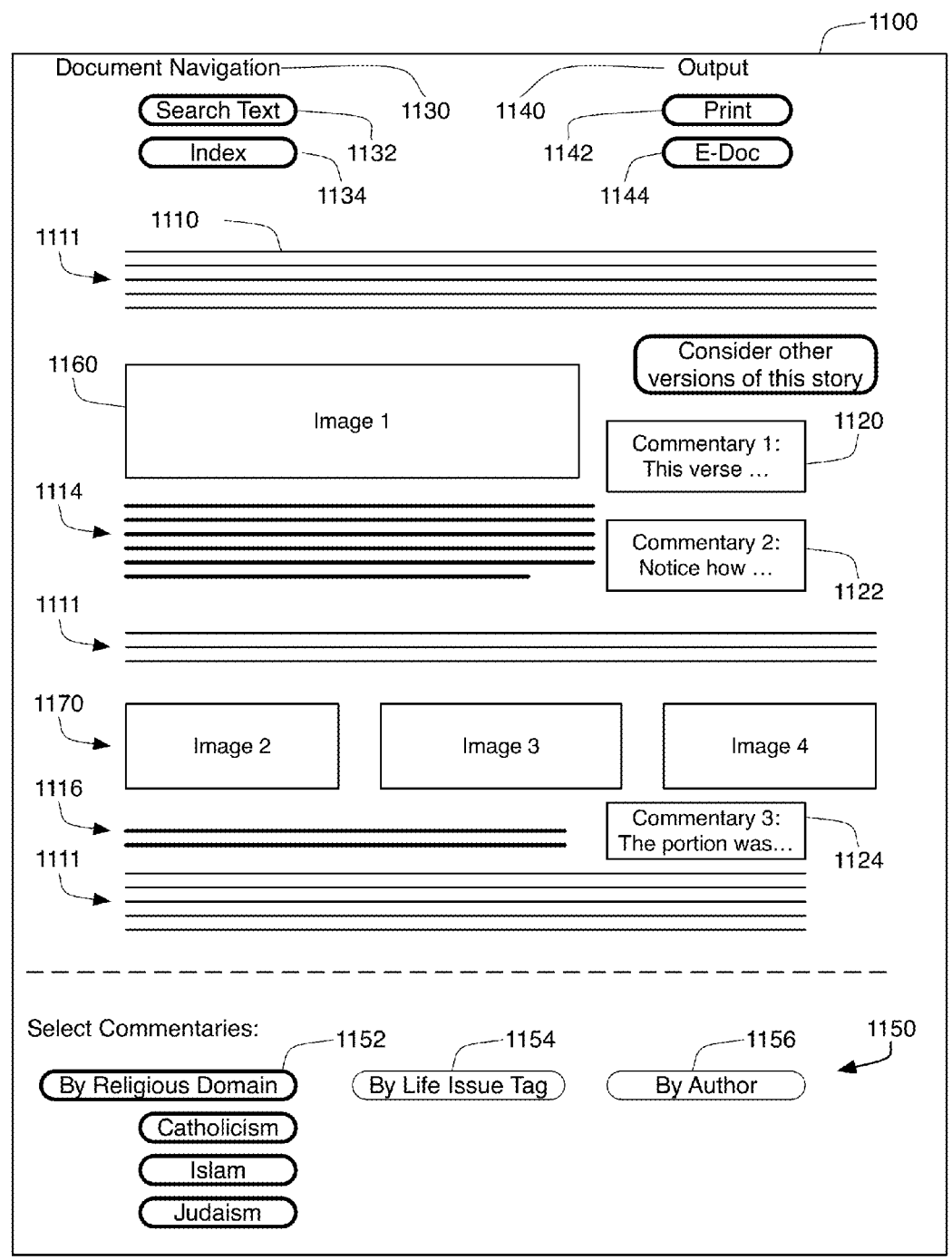
FIG. 11 is a schematic diagram showing a user interface for the creation and presentation of custom document study guide.

Because of this relationship structure, it is possible for a user to view a document 288 and be presented with commentaries 284 that are associated with the snippets 282 of that document 284 being viewed, images 287 that are associated with the stories told by those snippets 282, and even information about the people 285 that play a role in those stories. This possibility is illustrated in user interface 1100 shown in FIGS. 11 and 11a. In this interface 1100, the user is reading through a religious text 1110. The text 1110 shown in interface 1100 includes both uncommented text 1111, and two portions of commented text 1114 and 1116. These portions of text 1114, 1116 constitute snippets 282 in the research archive database 260 with corresponding ideas 280, commentaries 284, stories 283, person links 285, and images 287. The commented text 1114, 1116 can be visually distinguished from the uncommented text 1111 in a variety of ways, such as by varying the color, the font weight, the font family, or italicizing the font for the commented text 1114, 1116. This visual distinction tells the reader that these portions of text 1114, 1116 have been commented upon by an expert and are otherwise treated specially in user interface 1100. In this interface 1100, the snippets 1114, 1116 are right indented, and a portion of the commentaries available for the snippets 1114, 1116 are shown in-line next to the commented upon text portion. In FIG. 11, snippet 1114 is shown with two commentaries 1120, 1122, and snippet 1116 is shown as having one commentary 1124. Since only a portion of a commentary 1120-1124 can be shown on the interface 1100 without disrupting the user's ability to read through the religious text 1110 uninterrupted, the preferred embodiment requires the user to manually select (e.g., "click on") the displayed portion of the commentary 1120-1124 in order to have the full commentary shown.

Because each commentary 284 in the research archive database 260 is associated with a snippet 282 only in the context of an idea 280 related to a life issue tag 270, each of the displayed commentaries 1120-1124 will comment on the text 1114, 1116 in the context of their particular role 281, domain 290, and the relevant life issue tag 280. This context may be presented within or next to the displayed commentary 1120-1124, or may be disclosed only when the user follows a link (which may take the form of a URL link) to see the entire commentary.

The interface 1100 also displays image 1 (1160) in close relationship to snippet 1114, and images 2, 3, and 4 (together identified by figure numeral 1170) in close relationship to snippet 1116. These images 1160, 1170 were associated with these snippets 1114, 1116, respectively, through the database entities 287, 282 shown in FIG. 2. In this way, the document being reviewed in 1100 is automatically presented with images 1160, 1170 that are relevant to the current section being read by the user.

The interface 1100 also includes a navigation interface 1130 for navigating through the document 1110. In FIG. 11, the navigation interface 1130 includes an ability to search for particular text in the document (accessed through button 1132) or to review one or more key word indexes or other indexes or tables (such as a table of contents) for the document (index button 1134). The interface 1100 also includes an output interface 1140 that allows a user to select an option to print part or all of the document 1110, commentaries 1120-1124, and images 1160, 1170 (button 1142) or to create an electronic document 1144 such as a PDF document (button 1144). In the printed and electronic document versions, the full text of all commentaries 1120-1124 will be included, such as by inserting the commentaries directly into the text, the use of multiple columns, through footnotes, or through some other formatting option.

One of the primary features of the embodiment shown in the Figures is that it is possible to create a custom study-guide version of a religious text 1110 by allowing users to select which commentaries (such as commentaries 1120-1124) are displayed on the computerized interface 1100 or are included in the printed or e-document versions. In FIG. 11, the selection of commentaries is made in the selection portion 1150 of interface 1100, which includes options for three different techniques for selecting commentaries 1120-1124 for display: by religious domain 1152, by life issue tag 1154, and/or by author 1156. If the user selects one of these buttons 1152, 1154, 1156, an interface will be presented (not shown) that will allow the user to select one or more domains 290, life issue tags 270, or subject matter experts 286 for filtering the commentaries. In FIG. 11, the domain tag 1152 is shown as bolded, indicated that this option has been used to select the commentaries 1120-1124. In particular, the user has selected to show only commentaries that are associated (through ideas 280) with the domains 290 of Catholicism, Islam, and Judaism. This means that commentaries 284 written from a protestant or Eastern Orthodox perspective (for example) are not shown in interface 1100. If the user so desired, the displayed commentaries 1120-1124 could be further limited through the use of buttons 1154 and 1156. For example, the user may select to only view commentaries from a Catholic perspective dealing with the life issue tag of "death." In this manner, the user can create a customized study version of any religious document 288 in the research archive database 260, including only commentaries desired by the user, and presented either through a computerized interface, an electronic document, or a physically printed document.

Figure 12:
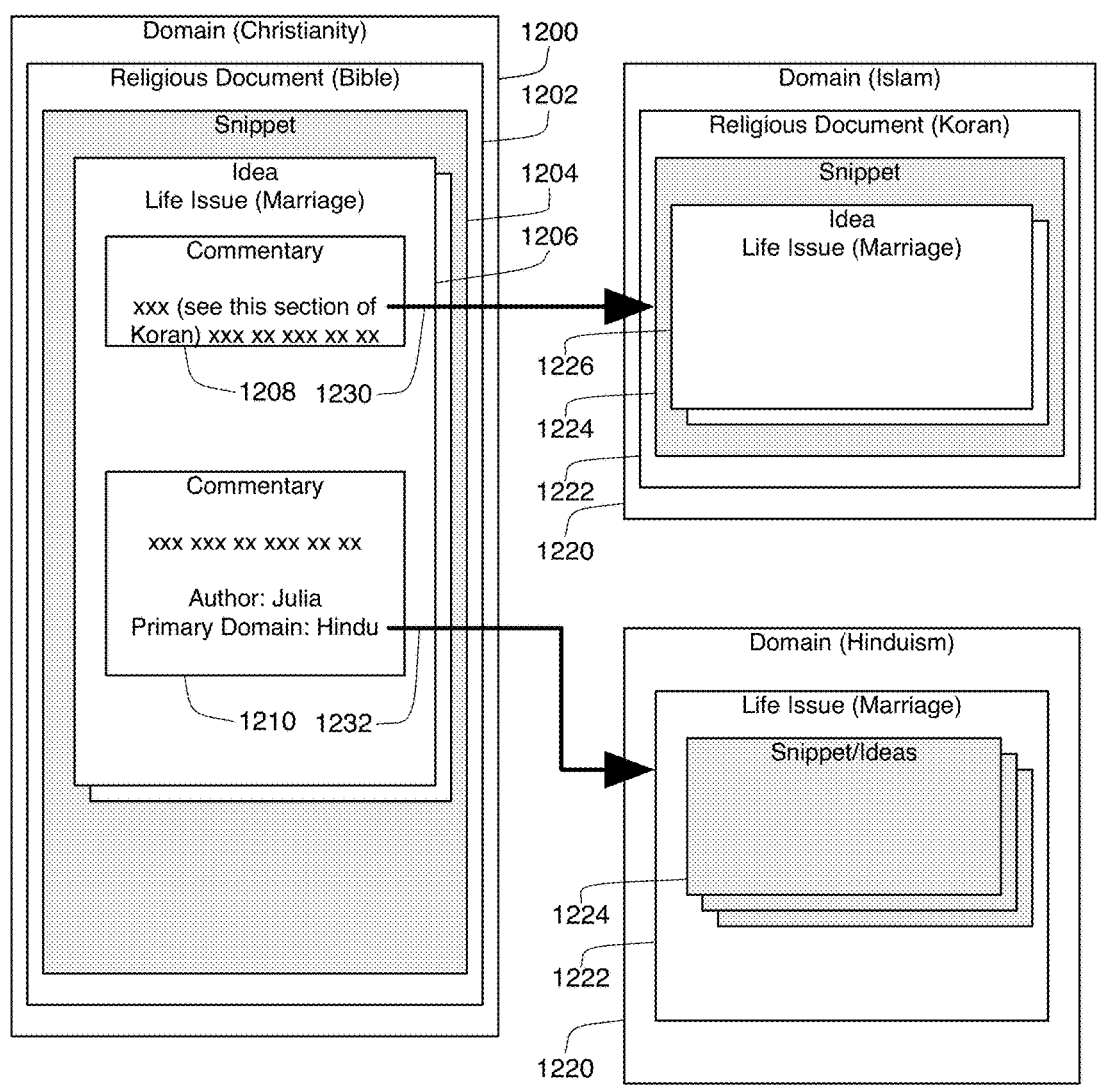
FIG. 12 is a schematic diagram showing explicit and implicit links between snippets, documents, and domains.

While the above descriptions explains how users can review ideas by searching for life issue tags, the use of the research archive database 260 allows multiple different paths for discovering data and useful commentaries. FIG. 12 shows two possible linkages between data elements that are implemented in another embodiment of the present invention. In FIG. 12, a user is reviewing an idea 1206 concerning the life issue tag of marriage. This idea is focused around a snippet 1204 of text taken from the bible 1202 from the Christianity religious domain 1200. In reviewing the commentaries 1208, 1210 written for this idea 1206 (analyzing the snippet 1204 in relation to the life issue tag 1206), the user can follow an explicit link that was placed in the commentary to a different portion of the research archive database 260. For example, commentary 1208 includes an explicit link (represented by arrow 1230) to a particular snippet 1224 of the Koran 1222. The Koran is a religious text found in a complete different religious domain 1220, but the subject matter expert who wrote commentary 1208 found a relationship between the snippet 1204 of the Bible 1202 and the snippet 1224 of the Koran 1222 (at least as in connection with the life issue tag of marriage). This relationship was incorporated into the commentary 1208, and users can review the snippet 1224 and study related ideas 1226 by following link 1230. In studying this idea 1226, the user not only studies the snippet 1224 itself, but also all of the commentaries written on the snippet by the various SMEs on the life issue tag of marriage.

The second commentary 1210 shown in FIG. 12 for idea 1206 was written by an author whose primary expertize is the domain of Hinduism 1220. This author may have been selected to write commentary 1210 because of the unique perspective that her knowledge of Hinduism brings to analyzing the biblical snippet 1204. A user that enjoys this perspective as seen in the commentary 1210 may be interested in studying more ideas concerning this same life issue (marriage) from the perspective of Hinduism. The interface presenting commentary 1210 to the user may include a link that asks if the user is interested in such a perspective. If so, the interface will identify how the same life issue tag (marriage) 1222 has been analyzed in the database 260 in the Hindu domain 1220. There are likely many snippets 1224 taken from the texts of Hinduism that relate to and have been analyzed in light of this life issue tags. Since ideas are simply analysis of snippets according to life issue tags, identifying snippets 1224 relating to the life issue tag of marriage 1222 effectively identifies the associated ideas. The link 1232 from commentary 1210 to the snippets/ideas 1224 in the Hinduism domain 1220 can be considered an implicit link, since the subject matter expert did not explicitly place that link within the commentary 1210.

Figure 13:
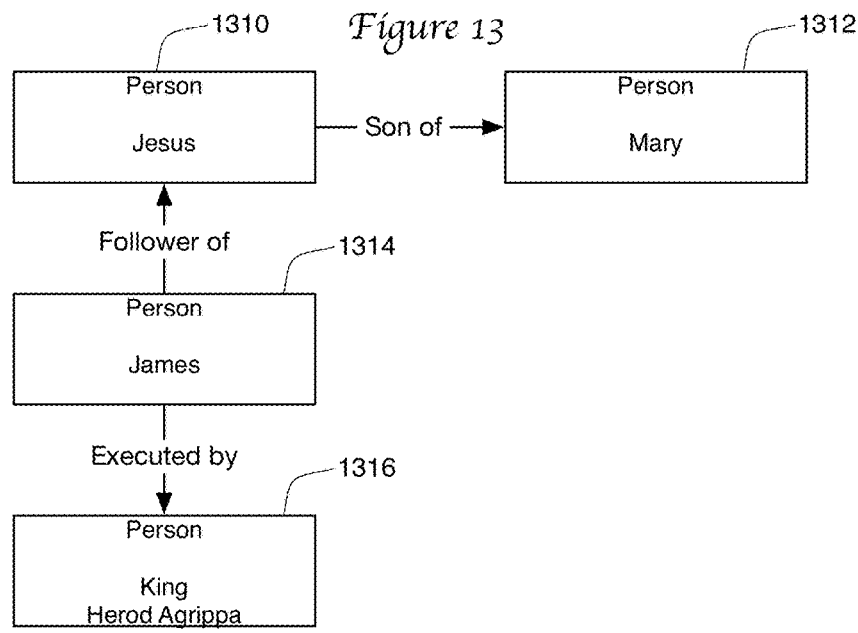
FIG. 13 is a schematic diagram showing relationships between individual person database entities.

FIG. 13 exemplifies some of the internal links between person database entities 285 that may exist in the research archive database 260. In FIG. 13, the person entity associated with Jesus 1310 is associated with (or related to) a separate person entity 1312 associated with his mother Mary. The association is shown in FIG. 13 with an arrow bearing the words "son of." These words indicate the role of the relationship. These roles are technically unidirectional, but most roles can be easily inverted with a different but related role. For instance, a link in one direction that indicates "son of" can be inverted to be a link in the other direction with a role of "parent of." The links shown in FIG. 13 are shown only in one direction, but can be considered invert-able or can be supplemented with additional links in the other direction. Thus, the database entities 1310-1316 indicate that Jesus was the son of Mary, James was a follower of Jesus, and that James was executed by King Herod Agrippa. In the preferred embodiment, two person entities 285 can be linked to together with multiple links each indicating a differing relationship between the two individuals.

Figure 14:
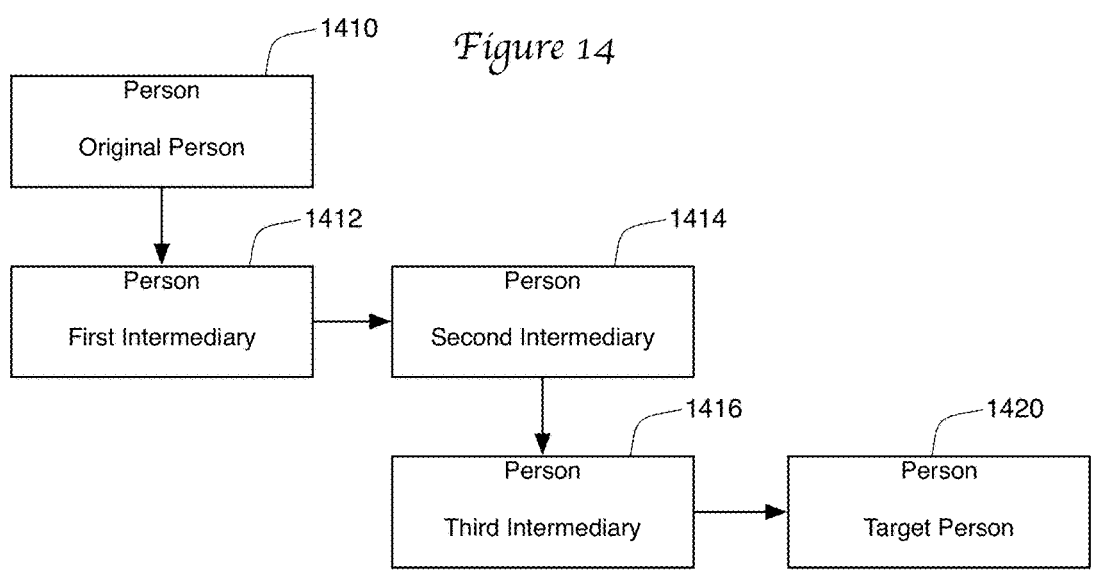
FIG. 14 is a schematic diagram showing a partial map of the personal connections between individuals

The power of establishing these relationships is that it allows complex relationships to be identified between persons found in or otherwise related to the religious documents 288 found in the research archive database 260. One example of this is found in the relationship "tree" or "map" shown in FIG. 14. A user may be investigating a particular person identified by original person database entity 1410 in FIG. 14. They may be curious about the relationship between this person and a particular target person identified by a different database entity 1420. The database can take advantage of the relationships and roles described in FIG. 13 to identify a map that links these two persons. In FIG. 14, the persons associated with the intermediary person records 1412, 1414, and 1416 form a personal link between the original and target person. By examining the roles in the links between each of these entities 1410-1420, the user will develop a better understanding concerning how these two religious personages intersected.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A computing machine for spiritual research comprising:
   a) a network interface providing data to a remote computing device over a computerized network;
   b) a processor that is controlled via programming instructions;
   c) a non-transitory computer readable memory;
   d) database programming stored on the non-transitory computer readable memory and performed by the processor, the database programming managing a database that is transformed during operation by the database programming, the database comprising:
      i) a plurality of document database entities each identifying a full text version of a spiritual document,
      ii) a plurality snippet database entities each identifying an excerpt from one spiritual document,
      iii) a plurality of life issue tag database entities each identifying a life issue, wherein the life issue is selected from a set comprising marriage, family, parenting, death, relationships, and divorce,
      iv) a plurality of commentary database entities each identifying a commentary on one excerpt,
      v) a plurality of first database relationships, each first database relationship establishing an association in the database between one document database entity and one snippet database entity to indicate that the spiritual document identified by the one document database entity is a source for the excerpt identified by the one snippet database entity,
      vi) a plurality of second database relationships, each second database relationship establishing an association in the database between one commentary database entity and one snippet database entity to indicate that the commentary identified by the one commentary database entity concerns the excerpt identified by the one snipped database entity, vii) a plurality of third database relationships, each third database relationship establishing an association in the database between one life issue tag database entity and one commentary database entity to indicate that the commentary identified by the one commentary database entity was written to reflect on the life issue identified by the one life issue tag database entity, viii) a plurality of story database entities each identifying a story, and ix) a plurality of fourth database relationships, each fourth database relationship establishing an association in the database between one story database entity and one snippet database entity, wherein the fourth database relationships establish a common story for a plurality of excerpts; and e) user interface programming stored on the non-transitory computer readable memory and performed by the processor, the user interface programming providing a user interface to the remote computing device over the computerized network that:

i) receives a selection of a selected spiritual document and a selected life issue, ii) uses the database relationships to identify commentaries on excerpts of the selected spiritual document wherein the identified commentaries comment on the identified excerpts reflecting on the selected life issue, and iii) presents the selected spiritual document over the user interface by visually distinguishing the identified excerpts while simultaneously presenting the identified commentaries in close visual proximity to the identified excerpts and wherein the identified commentaries are presented in close visual proximity to the identified excerpts by displaying only a portion of the identified commentaries along with a URL link in the user interface that, when followed, presents the full identified commentary.

2. The computing machine of claim 1, further wherein the provided user interface also:

iv) presents, adjacent to a first excerpt in the spiritual document, a link to a different excerpt in the same spiritual document that is linked to the common story.

3. The computing machine of claim 1, further wherein the provided user interface also:

iv) presents, adjacent to a first excerpt in the spiritual document, a link to a different excerpt in a different spiritual document that is linked to the common story.

4. The computing machine of claim 1, wherein the database further comprises:

x) a plurality of image database entities each identifying an image, and xi) a plurality of fifth database relationships, each fifth database relationship establishing an association in the database between one image database entity and one story database entity to indicate that the image in the one image database entity depicts the story in the one story database entity;

further wherein the user interface displays a particular image adjacent to a particular excerpt when the fourth and fifth database relationships indicate that the particular image depicts a particular story associated with the particular excerpt.

5. The server computing machine of claim 1, wherein the server computing machine comprises a plurality of separate physical devices with separate processors, separate network interfaces, and separate non-transitory computer readable memories, the separate physical devices acting in concert as a single server computing machine according to the programming instructions.

6. A computing machine for spiritual research comprising:

a) a network interface providing data to a remote computing device over a computerized network;

b) a processor that is controlled via programming instructions;

c) a non-transitory computer readable memory;

d) database programming stored on the non-transitory computer readable memory and performed by the processor, the database programming managing a database that is transformed during operation by the database programming, the database comprising:

i) a plurality of document database entities each identifying a full text version of a spiritual document, ii) a plurality snippet database entities each identifying an excerpt from one spiritual document, iii) a plurality of life issue tag database entities each identifying a life issue, wherein the life issue is selected from a set comprising marriage, family, parenting, death, relationships, and divorce, iv) a plurality of commentary database entities each identifying a commentary on one excerpt, v) a plurality of first database relationships, each first database relationship establishing an association in the database between one document database entity and one snippet database entity to indicate that the spiritual document identified by the one document database entity is a source for the excerpt identified by the one snippet database entity, vi) a plurality of second database relationships, each second database relationship establishing an association in the database between one commentary database entity and one snippet database entity to indicate that the commentary identified by the one commentary database entity concerns the excerpt identified by the one snipped database entity, vii) a plurality of third database relationships, each third database relationship establishing an association in the database between one life issue tag database entity and one commentary database entity to indicate that the commentary identified by the one commentary database entity was written to reflect on the life issue identified by the one life issue tag database entity, viii) a plurality of image database entities each identifying an image, and ix) a plurality of fourth database relationships, each fourth database relationship establishing an association in the database between one image database entity and one snippet database entity to indicate that the image in the one image database entity depicts the excerpt in the one snippet database entity; and e) user interface programming stored on the non-transitory computer readable memory and performed by the processor, the user interface programming providing a user interface to the remote computing device over the computerized network that:

i) receives a selection of a selected spiritual document and a selected life issue, ii) uses the database relationships to identify commentaries on excerpts of the selected spiritual document wherein the identified commentaries comment on the identified excerpts reflecting on the selected life issue, and iii) presents the selected spiritual document over the user interface by visually distinguishing the identified excerpts while simultaneously presenting the identified commentaries in close visual proximity to the identified excerpts;

further wherein the user interface displays a particular image adjacent to a particular excerpt when the fourth database relationships indicate that the particular image depicts the particular excerpt.

7. The computing machine of claim 6, wherein the images identified by the image database entities are stored in the database.

8. The computing machine of claim 6, wherein the images identified by the image database entities are stored outside the database and accessed through a link found in the image database entities.

9. The computing machine of claim 6, wherein the database further comprises:
   x) a plurality of person database entities each identifying an individual person, and
   xi) a plurality of fifth database relationships, each fifth database relationship establishing an association in the database between one image database entity and one person database entity to indicate that the image in the one image database entity depicts the individual person in the one person database entity;
   further wherein the user interface displays a link to additional information about a particular person adjacent the particular image when the fifth database relationships indicate that the particular image depicts the particular person.

10. A computing machine for spiritual research comprising:
   a) a network interface providing data to a remote computing device over a computerized network;
   b) a processor that is controlled via programming instructions;
   c) a non-transitory computer readable memory;
   d) database programming stored on the non-transitory computer readable memory and performed by the processor, the database programming managing a database that is transformed during operation by the database programming, the database comprising:
      i) a plurality of document database entities each identifying a full text version of a spiritual document,
      ii) a plurality snippet database entities each identifying an excerpt from one spiritual document,
      iii) a plurality of life issue tag database entities each identifying a life issue, wherein the life issue is selected from a set comprising marriage, family, parenting, death, relationships, and divorce,
      iv) a plurality of commentary database entities each identifying a commentary on one excerpt,
      v) a plurality of first database relationships, each first database relationship establishing an association in the database between one document database entity and one snippet database entity to indicate that the spiritual document identified by the one document database entity is a source for the excerpt identified by the one snippet database entity,
      vi) a plurality of second database relationships, each second database relationship establishing an association in the database between one commentary database entity and one snippet database entity to indicate that the commentary identified by the one commentary database entity concerns the excerpt identified by the one snipped database entity,
      vii) a plurality of third database relationships, each third database relationship establishing an association in the database between one life issue tag database entity and one commentary database entity to indicate that the commentary identified by the one commentary database entity was written to reflect on the life issue identified by the one life issue tag database entity,
      viii) a plurality of person database entities each identifying an individual person, and
      ix) a plurality of fourth database relationships, each fourth database relationship establishing an association in the database between one person database entity and one snippet database entity to indicate that the individual person in the one person database entity is mentioned in the excerpt in the one snippet database entity; and
   e) user interface programming stored on the non-transitory computer readable memory and performed by the processor, the user interface programming providing a user interface to the remote computing device over the computerized network that:
      i) receives a selection of a selected spiritual document and a selected life issue,
      ii) uses the database relationships to identify commentaries on excerpts of the selected spiritual document wherein the identified commentaries comment on the identified excerpts reflecting on the selected life issue, and
      iii) presents the selected spiritual document over the user interface by visually distinguishing the identified excerpts while simultaneously presenting the identified commentaries in close visual proximity to the identified excerpts;
      further wherein the user interface displays a link to additional information about a particular person when the fourth database relationships indicate that the particular person is associated with one of the identified excerpts.

11. The computing machine of claim 10, wherein the link is added to the name of the particular person when the name appears within the one identified excerpt.

12. A computing machine for spiritual research comprising:
   a) a network interface providing data and a user interface to a remote computing device over a computerized network;
   b) a processor that is controlled via programming instructions;
   c) a non-transitory computer readable memory;
   d) database programming stored on the non-transitory computer readable memory and performed by the processor, the database programming managing a database that is transformed during operation by the database programming, the database comprising:
      i) a plurality of life issue tag database entities each identifying a life issue, wherein the life issue is selected from a set comprising marriage, family, parenting, death, relationships, and divorce,
      ii) a plurality snippet database entities each identifying an excerpt from a spiritual document,
      iii) a plurality of commentary database entities each identifying a commentary on one excerpt,
      iv) a plurality of story database entities each identifying a story,
      v) a plurality of first database relationships, each first database relationship establishing an association in the database between one commentary database entity and one snippet database entity to indicate that the commentary identified by the one commentary database entity was written concerning the excerpt identified by the one snipped database entity,
- vi) a plurality of second database relationships, each second database relationship establishing an association in the database between one life issue tag database entity and one commentary database entity to indicate that the commentary identified by the one commentary database entity was written from to reflect on the life issue identified by the one life issue tag database entity,
- vii) a plurality of third database relationships, each third database relationship establishing an association in the database between one story database entity and one snippet database entity, wherein the third database relationships establish a common story for a plurality of excerpts,
- viii) a plurality of image database entities each identifying an image, and
- ix) a plurality of fourth database relationships, each fourth database relationship establishing an association in the database between one image database entity and one story database entity to indicate that the image in the one image database entity depicts the story in the one story database entity; and e) user interface programming stored on the non-transitory computer readable memory and performed by the processor, the user interface programming providing a user interface to the remote computing device over the computerized network that:
- i) receives a selection of a selected excerpt and a selected life issue, wherein a particular third database relationship links the selected excerpt to a particular story,
- ii) uses the database relationships to identify commentaries on the selected snippet written to reflect on the selected life issue, and
- iii) display the identified commentaries along with a link to a different snippet that is linked via the third database relationships to the particular story of the selected excerpt further wherein the user interface displays a particular image adjacent to a particular excerpt when the third and fourth database relationships indicate that the particular image depicts a particular story associated with the particular excerpt.

13. The computing machine of claim 12, wherein selected excerpt and the selected life issue are associated with each other through an idea database entity in the database, wherein each idea database entity associates a single excerpt with a single life issue and with a plurality of commentaries that discuss the single excerpt in the context of the single life issue tag.

14. A computing machine for spiritual research comprising:
- a) a network interface providing data and a user interface to a remote computing device over a computerized network;
- b) a processor that is controlled via programming instructions;
- c) a non-transitory computer readable memory;
- d) database programming stored on the non-transitory computer readable memory and performed by the processor, the database programming managing a database that is transformed during operation by the database programming, the database comprising:
  - i) a plurality of life issue tag database entities each identifying a life issue, wherein the life issue is selected from a set comprising marriage, family, parenting, death, relationships, and divorce,
  - ii) a plurality snippet database entities each identifying an excerpt from a spiritual document,
  - iii) a plurality of commentary database entities each identifying a commentary on one excerpt,
  - iv) a plurality of story database entities each identifying a story,
  - v) a plurality of first database relationships, each first database relationship establishing an association in the database between one commentary database entity and one snippet database entity to indicate that the commentary identified by the one commentary database entity was written concerning the excerpt identified by the one snipped database entity,
  - vi) a plurality of second database relationships, each second database relationship establishing an association in the database between one life issue tag database entity and one commentary database entity to indicate that the commentary identified by the one commentary database entity was written from to reflect on the life issue identified by the one life issue tag database entity,
  - vii) a plurality of third database relationships, each third database relationship establishing an association in the database between one story database entity and one snippet database entity, wherein the third database relationships establish a common story for a plurality of excerpts,
  - viii) a plurality of person database entities each identifying an individual person, and
  - ix) a plurality of fourth database relationships, each fourth database relationship establishing an association in the database between one person database entity and one snippet database entity to indicate that the individual person in the one person database entity is mentioned in the excerpt in the one snippet database entity; and
- e) user interface programming stored on the non-transitory computer readable memory and performed by the processor, the user interface programming providing a user interface to the remote computing device over the computerized network that:
  - i) receives a selection of a selected excerpt and a selected life issue, wherein a particular third database relationship links the selected excerpt to a particular story,
  - ii) uses the database relationships to identify commentaries on the selected snippet written to reflect on the selected life issue, and
  - iii) display the identified commentaries along with a link to a different snippet that is linked via the third database relationships to the particular story of the selected excerpt;

further wherein the user interface displays a link to additional information about a particular person when the fourth database relationships indicate that the particular person is associated with the particular snippet.

15. The computing machine of claim 14, further comprising fifth database relationships between separate person database entities, further wherein the user interface displays a map showing relationships between persons identified by fifth database relationships.

16. The computing machine of claim 14, wherein the fifth database relationships define roles between the individual persons associated through the fifth database relationships and further wherein the roles are indicated on the displayed map.

17. A method comprising:
   a) maintaining an archive database having database entities for:
      i) a life issue selected from a set comprising marriage, family, parenting, death, relationships, and divorce;
      ii) a first excerpt from a first spiritual document, the first spiritual document being associated with a first spiritual domain;
      iii) a user;
      iv) a user written commentary on the excerpt reflecting on the life issue and written by the user;
      v) an expert;
      vi) an expert written commentary on the excerpt reflecting on the life issue and written by the expert;
   b) receiving over a network interface a ranking of the user written commentary on the excerpt;
   c) storing the ranking in the archive database in connection with the user;
   d) receiving a request for commentaries on the excerpt over the network interface;
   e) presenting over the network interface the user written commentary and the expert written commentary, wherein the user written commentary is displayed in an altered manner based on analysis of rankings in the archive database stored in connection with the user;
   wherein the expert is associated with a second spiritual domain different than the first spiritual domain with a second and third religious document being associated with the second religious domain;
   wherein the step of presenting over the network interface further comprising presenting in association with the expert written commentary an implicit link to a set of commentaries on the second spiritual document reflecting on the life issue; and
   wherein the step of presenting over the network interface further comprising presenting in association with the expert written commentary an explicit link created by the expert and inserted into the expert written commentary, the explicit link being made to a different commentary on the third spiritual document.

* * * * *